US010846118B2

(12) United States Patent
Khalid et al.

(10) Patent No.: US 10,846,118 B2
(45) Date of Patent: *Nov. 24, 2020

(54) MINI-CLOUD SYSTEM WITH EMULATOR FOR ENABLING USER SUBSCRIPTION TO CLOUD SERVICE

(71) Applicants: ATM Shafiqul Khalid, Redmond, WA (US); Mahruma Khatoon Siddiqua, Redmond, WA (US)

(72) Inventors: ATM Shafiqul Khalid, Redmond, WA (US); Mahruma Khatoon Siddiqua, Redmond, WA (US)

(73) Assignee: ATM Shafiqul Khalid, Redmond, WA (US)

( * ) Notice: Subject to any disclaimer, the term of this patent is extended or adjusted under 35 U.S.C. 154(b) by 394 days.

This patent is subject to a terminal disclaimer.

(21) Appl. No.: 15/391,819

(22) Filed: Dec. 27, 2016

(65) Prior Publication Data
US 2017/0116022 A1 Apr. 27, 2017

Related U.S. Application Data

(63) Continuation of application No. 12/951,081, filed on Nov. 22, 2010, now Pat. No. 8,782,637.

(51) Int. Cl.
*G06F 9/455* (2018.01)
*G06F 8/61* (2018.01)
*G06F 9/50* (2006.01)
*H04L 29/08* (2006.01)

(52) U.S. Cl.
CPC ............ *G06F 9/45558* (2013.01); *G06F 8/61* (2013.01); *G06F 9/45508* (2013.01); *G06F 9/5072* (2013.01); *H04L 67/1097* (2013.01); *G06F 2009/4557* (2013.01); *G06F 2009/45595* (2013.01); *Y02D 10/42* (2018.01)

(58) Field of Classification Search
None
See application file for complete search history.

(56) References Cited

U.S. PATENT DOCUMENTS

| | | | |
|---|---|---|---|
| 8,209,408 B1 * | 6/2012 | Huang | G06F 9/45558 709/223 |
| 2003/0229900 A1 * | 12/2003 | Reisman | G06F 17/30873 725/87 |
| 2008/0082811 A1 * | 4/2008 | Davis | G06F 9/4401 713/2 |

(Continued)

*Primary Examiner* — Bradley A Teets

(57) ABSTRACT

A mini-cloud system has been described to enable subscription or service model for computing infrastructure, software, and digital content. The mini-cloud system works as a pipeline for information delivery connecting end user, infrastructure provider, content provider, and retailer offering automatic provisioning of infrastructure, content life cycle management, automatic upgrade, servicing, and license managements based on subscription model. Mini-cloud system uses a subscription management component and virtualization host to back computing environment, then adds routing component to connect to back-end cloud infrastructure along with a digital content delivery framework. The system allows a user to subscribe in a computing environment, preferred software applications, and digital content like movie and pay like a monthly utility bill.

20 Claims, 21 Drawing Sheets

(56) References Cited

U.S. PATENT DOCUMENTS

2008/0228865 A1* 9/2008 Cruzada ............... H04L 67/10
709/203
2011/0035574 A1* 2/2011 Jevans ............... G06F 9/4406
713/2

* cited by examiner

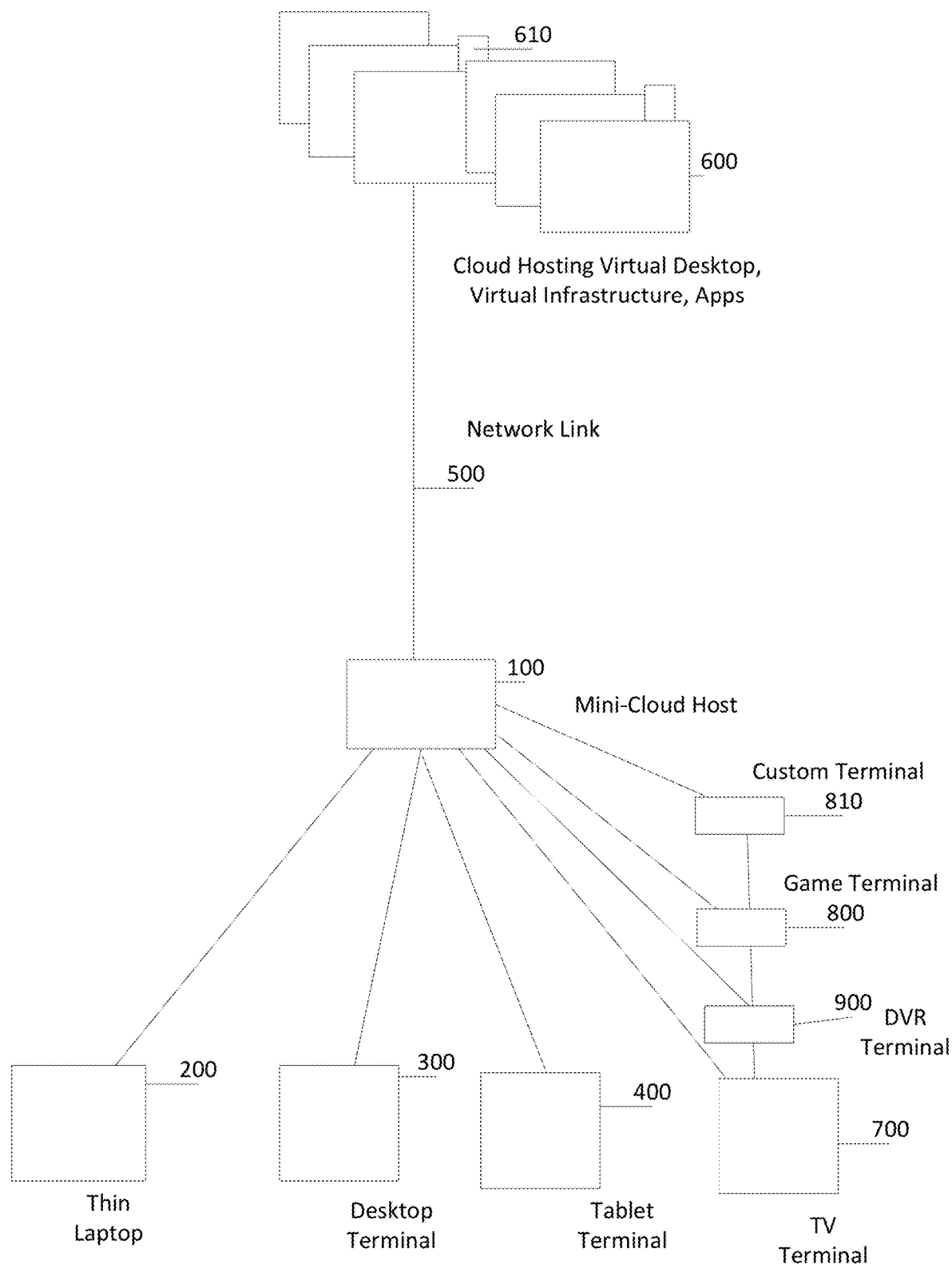
Figure 1: A typical settings for home users using mini-cloud in place of a DSL modem.

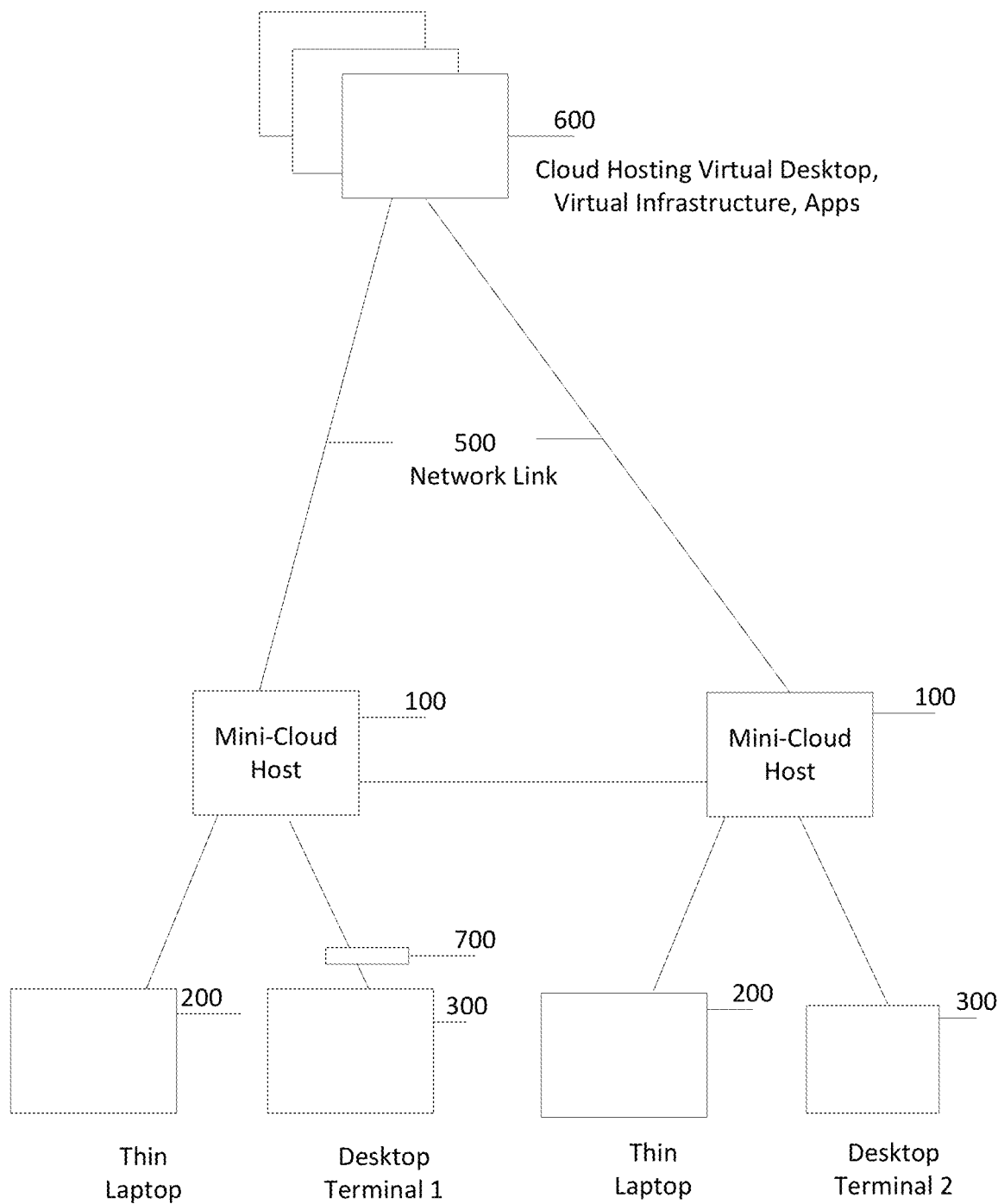
Figure 2: A typical setting for small business or branch office.

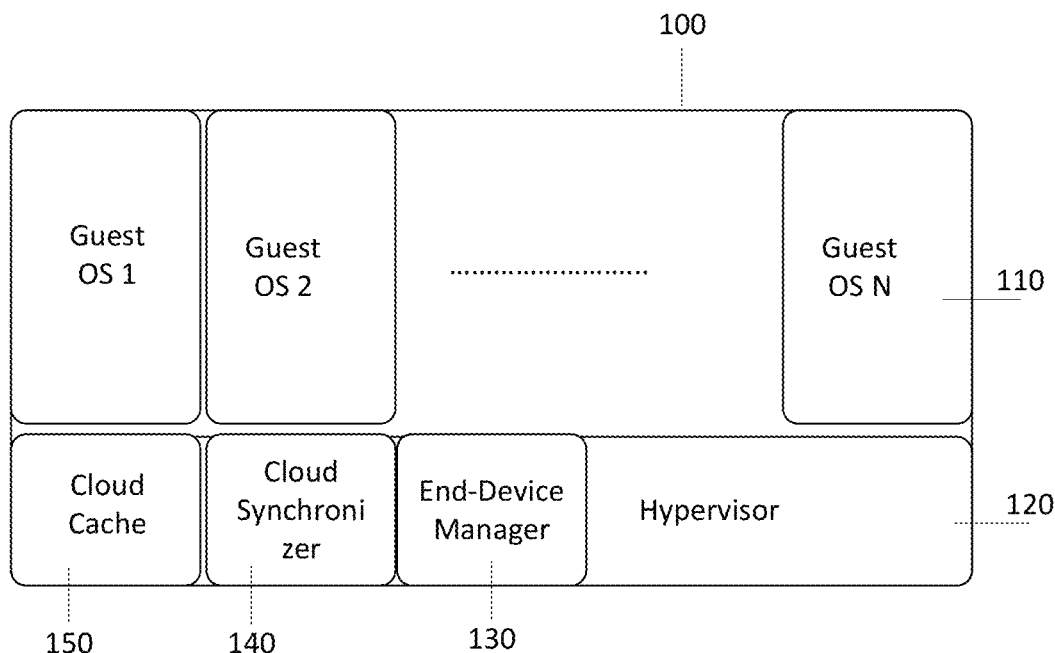
Figure 3: Mini-Cloud architecture.
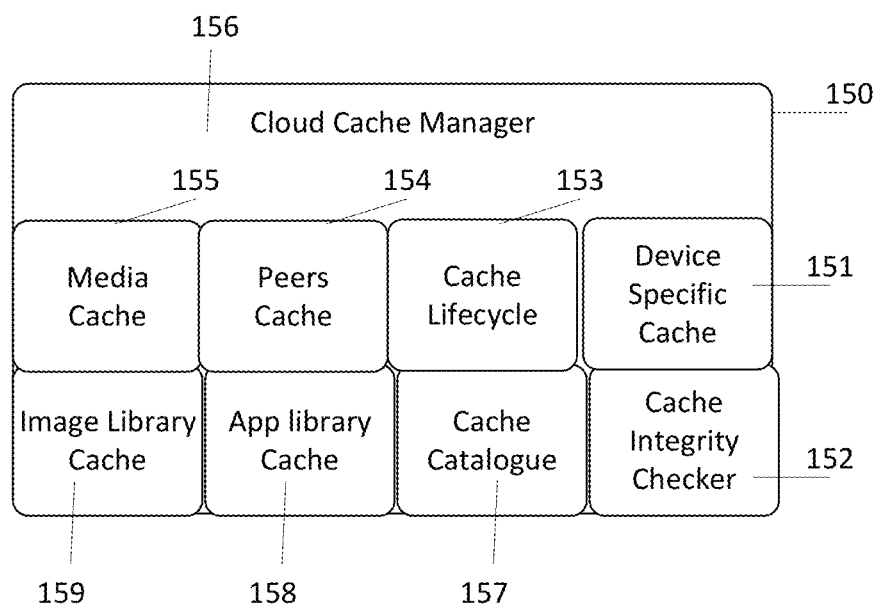
Figure 4.1: Cloud cache component.

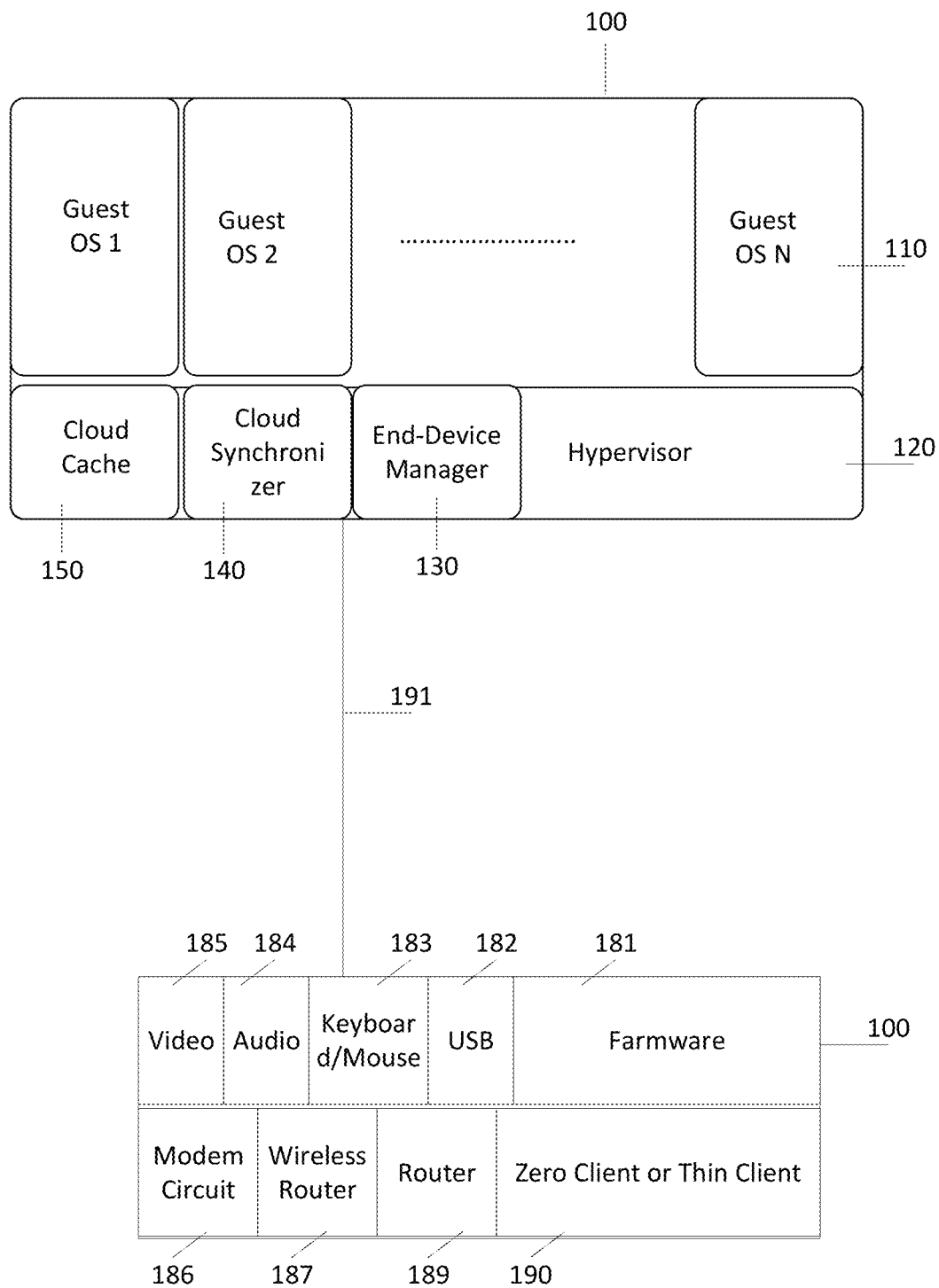
Figure 4.2: Mini-cloud host with thin client.

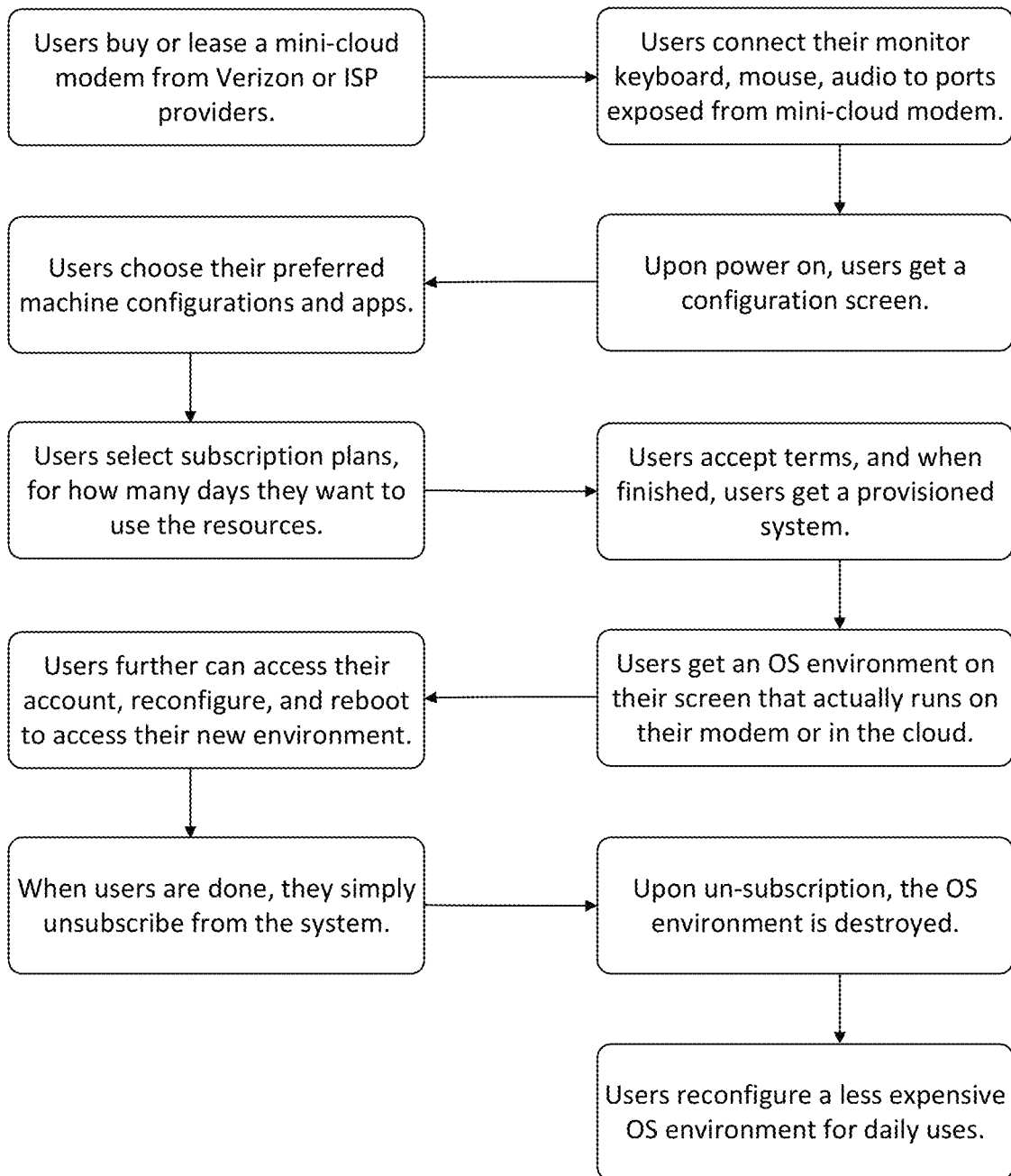
Figure 5: Steps users take to use mini-cloud systems.

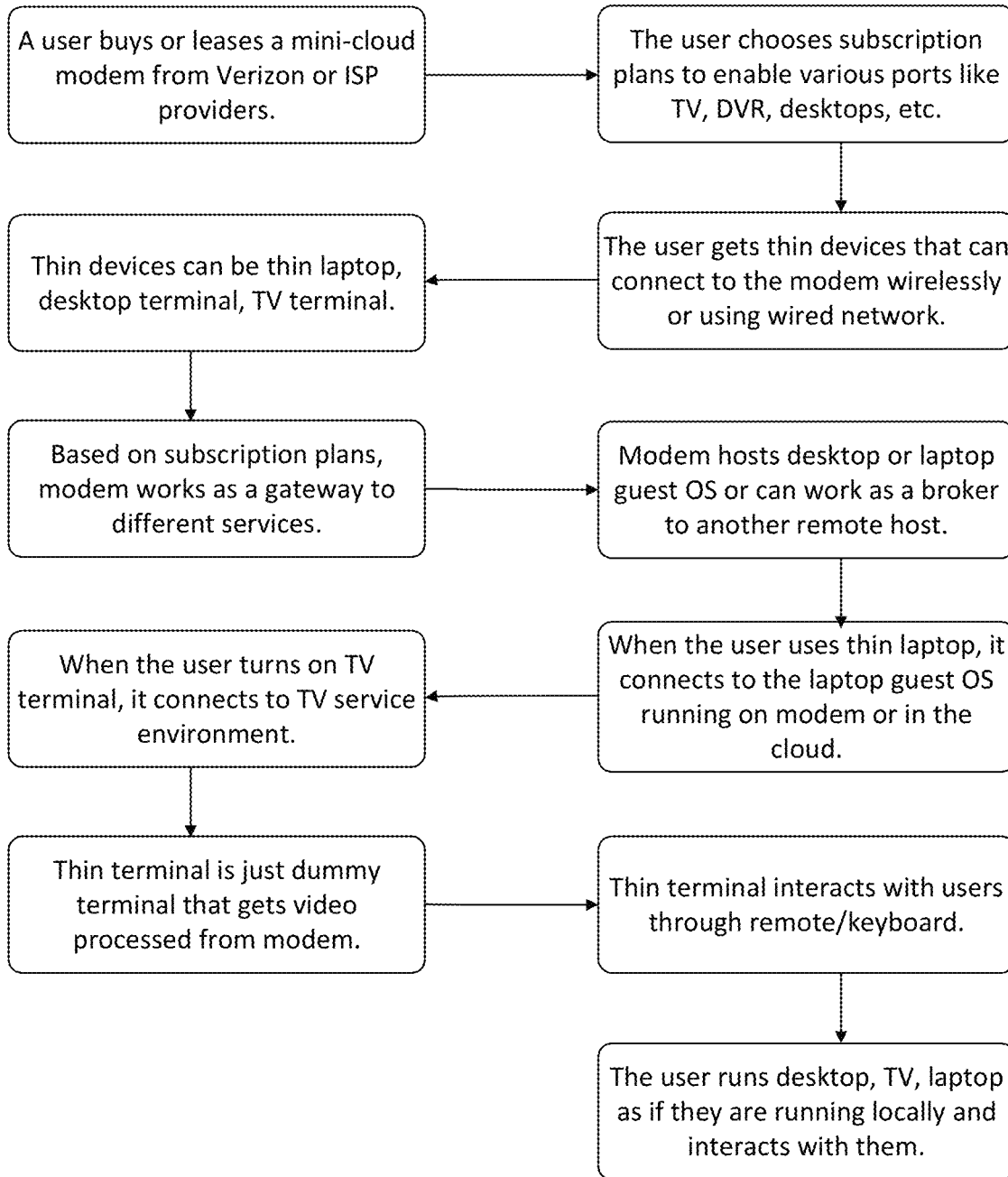
Figure 6: Steps a user takes to use mini-cloud systems for home entertainment.

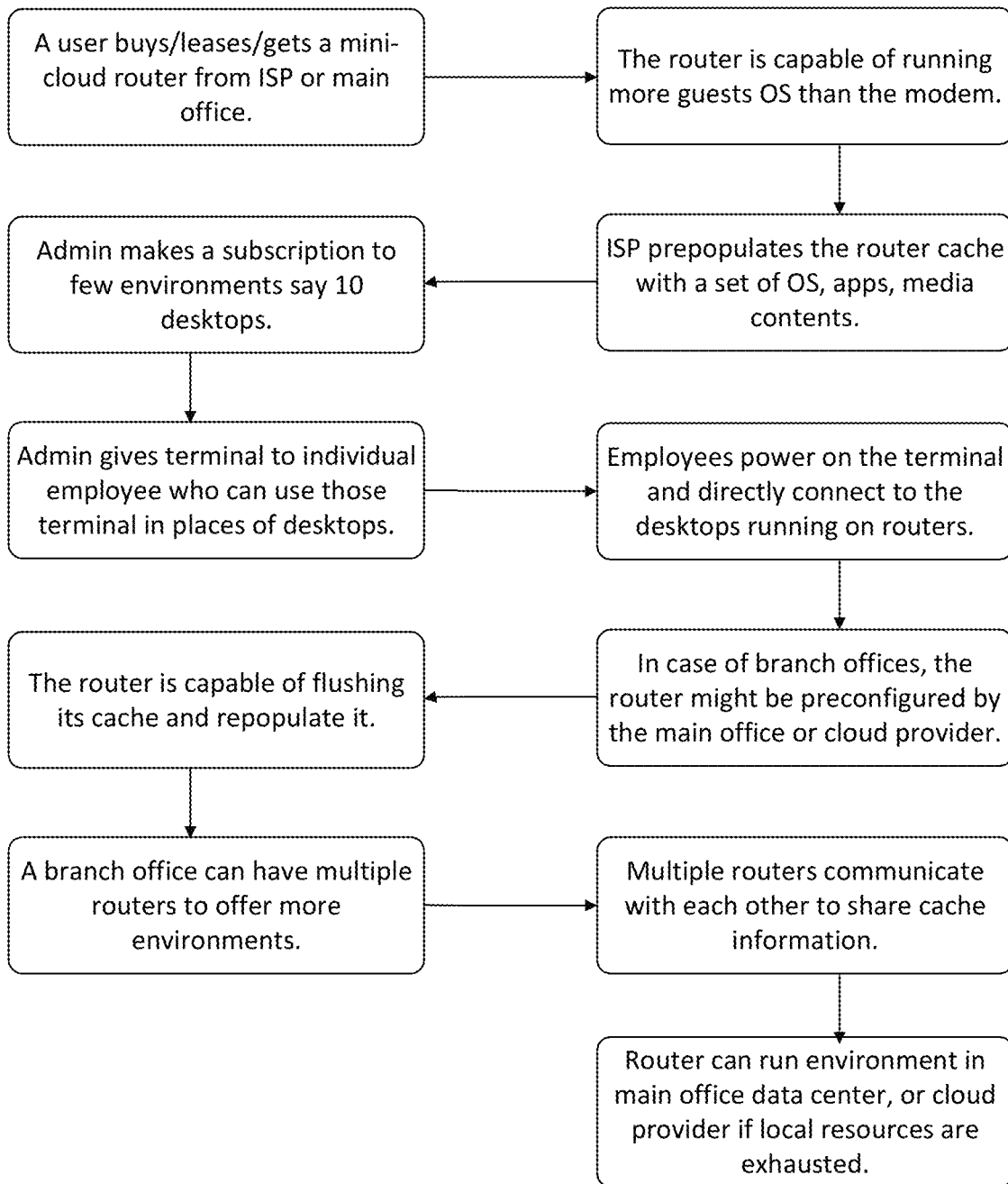
Figure 7: Steps an administrator takes to set up branch office or a small office.

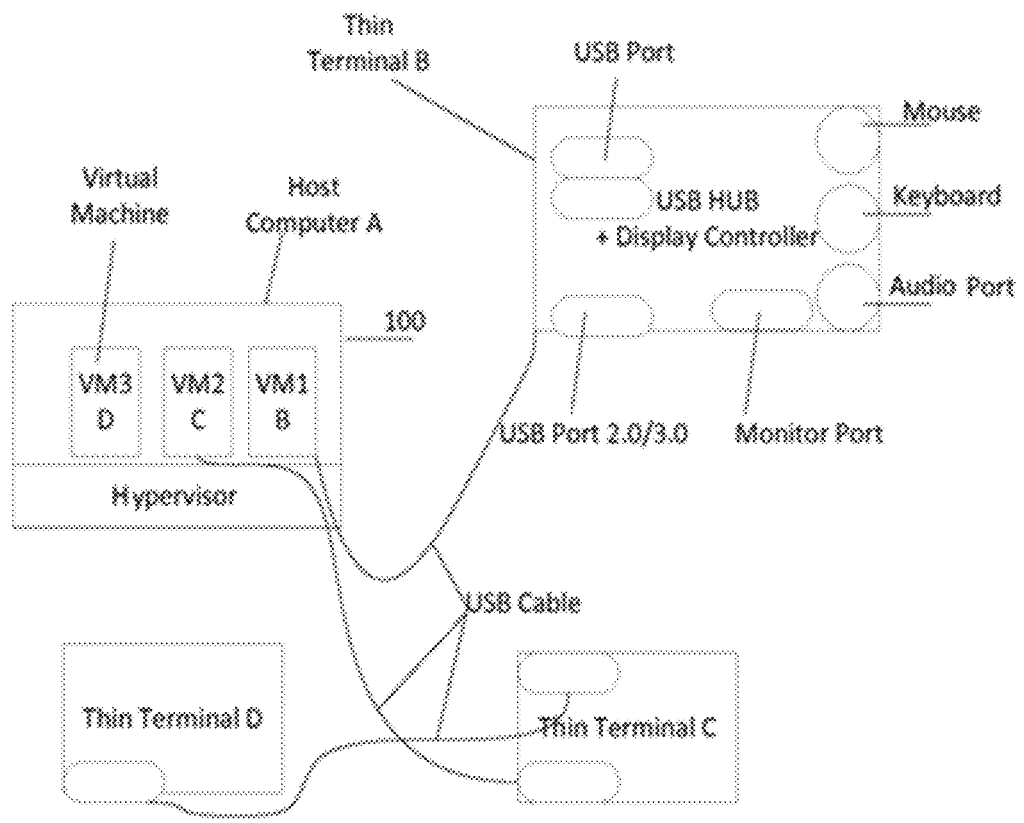
Figure 8: Mini-cloud modem with USB-connected terminals.

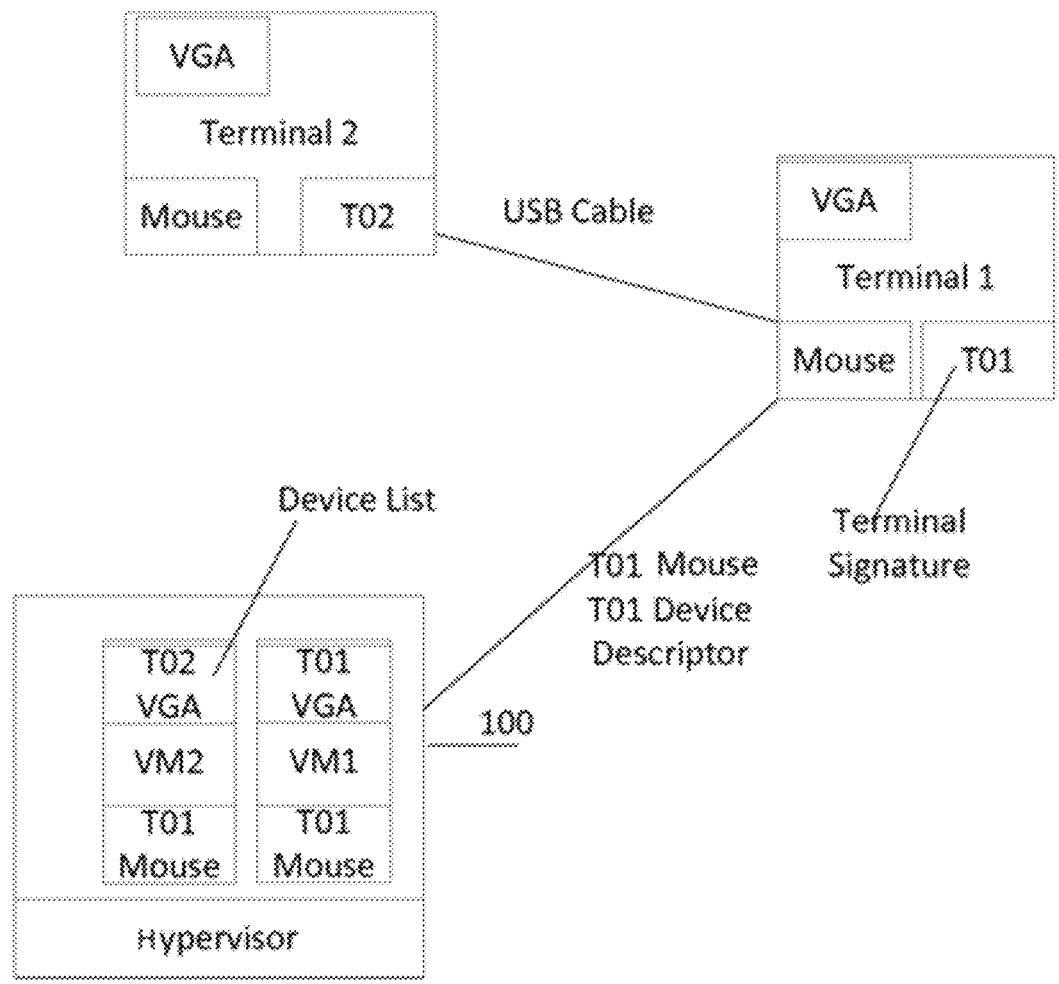
Figure 9: Mini-cloud modem with two terminals.

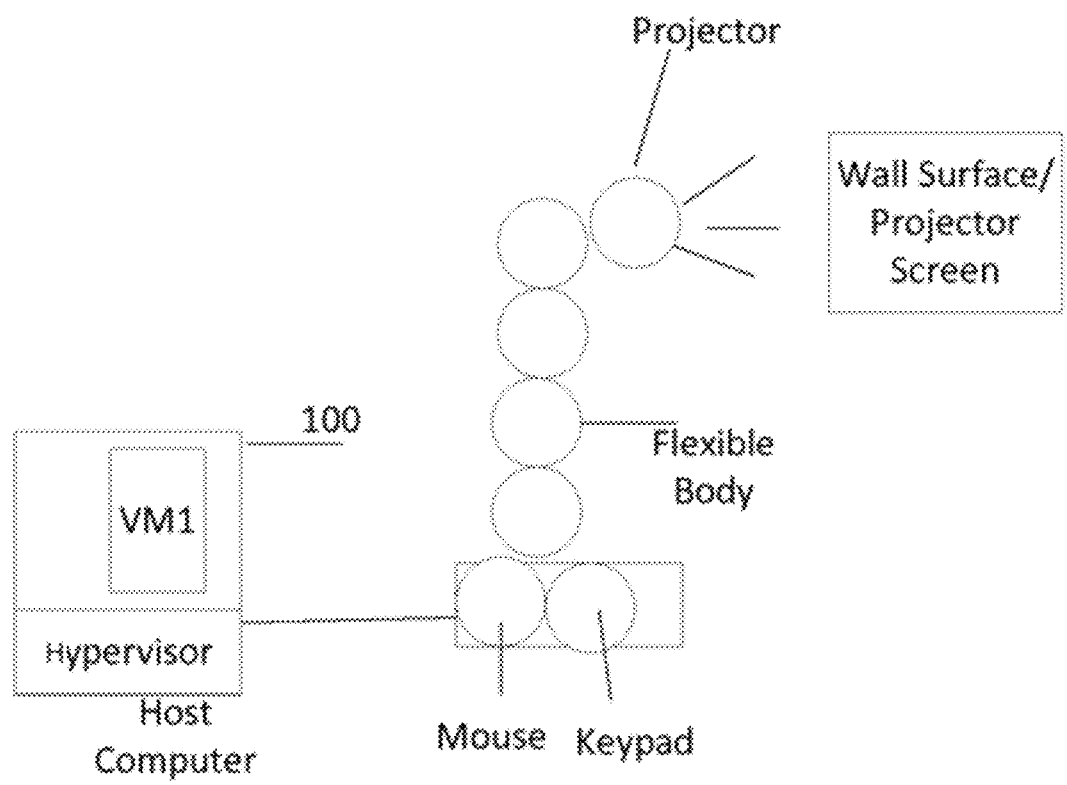
Figure 10: Mini-cloud modem with terminal with projector.

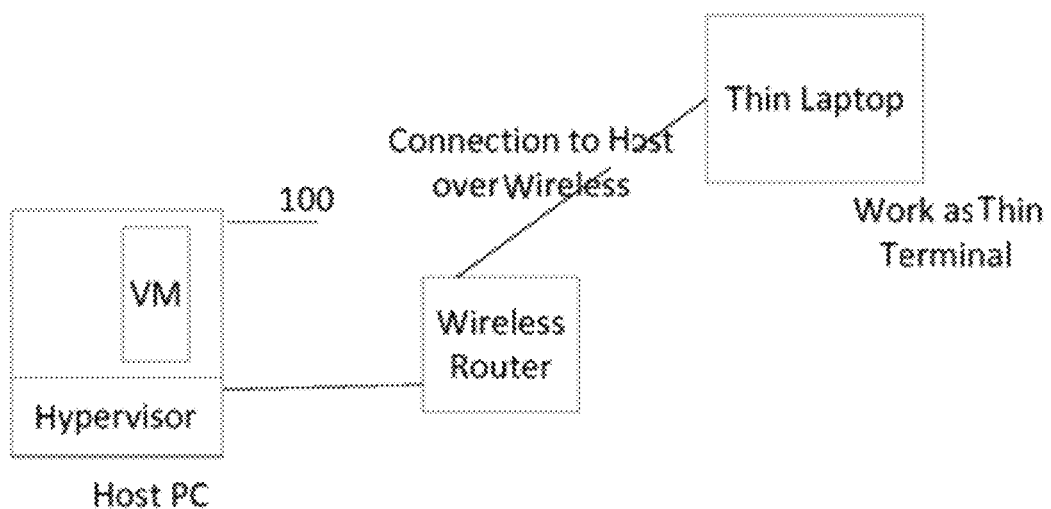
Figure 11: Mini-cloud modem with thin laptop.
Here, thin laptop can connect to a PC or a mini-cloud
consisting of wireless router and a hypervisor.

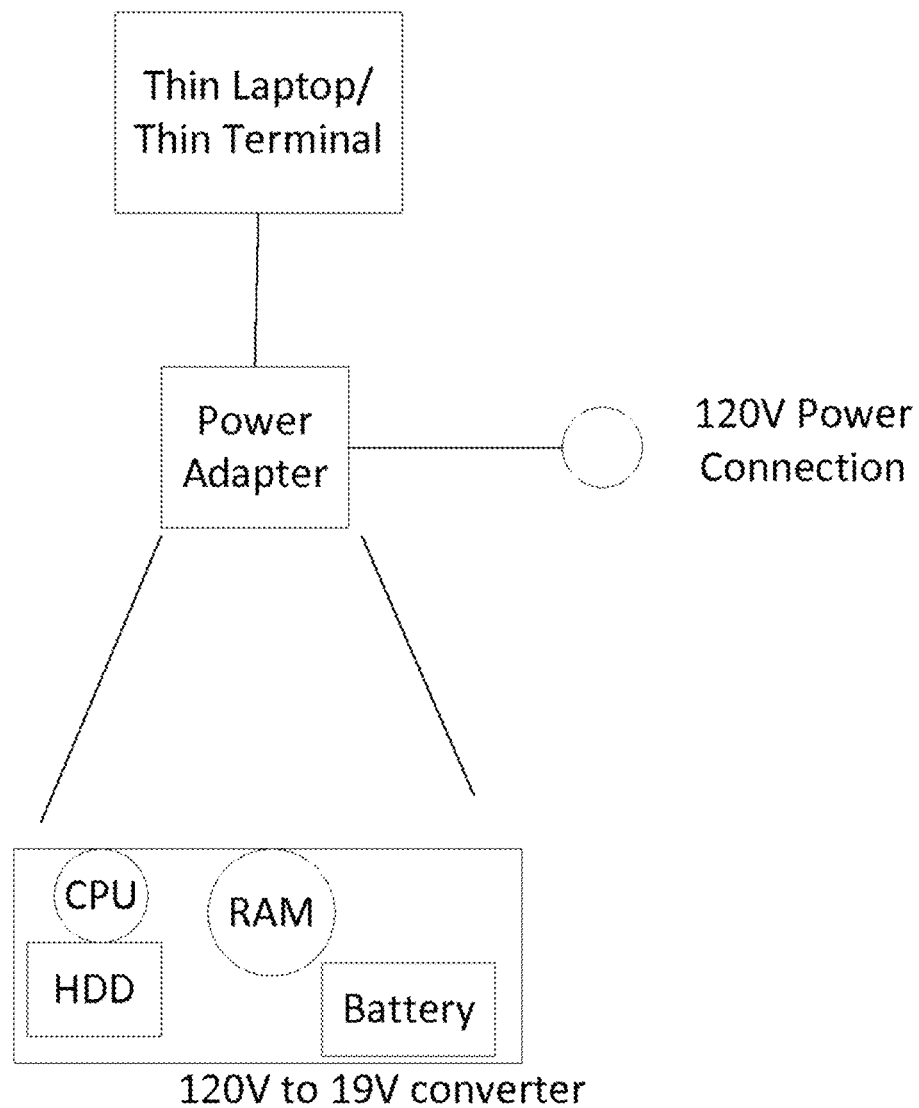
Figure 12: Thin laptop with a power adapter where power adapter contains H/W enough to deliver laptop OS environments.

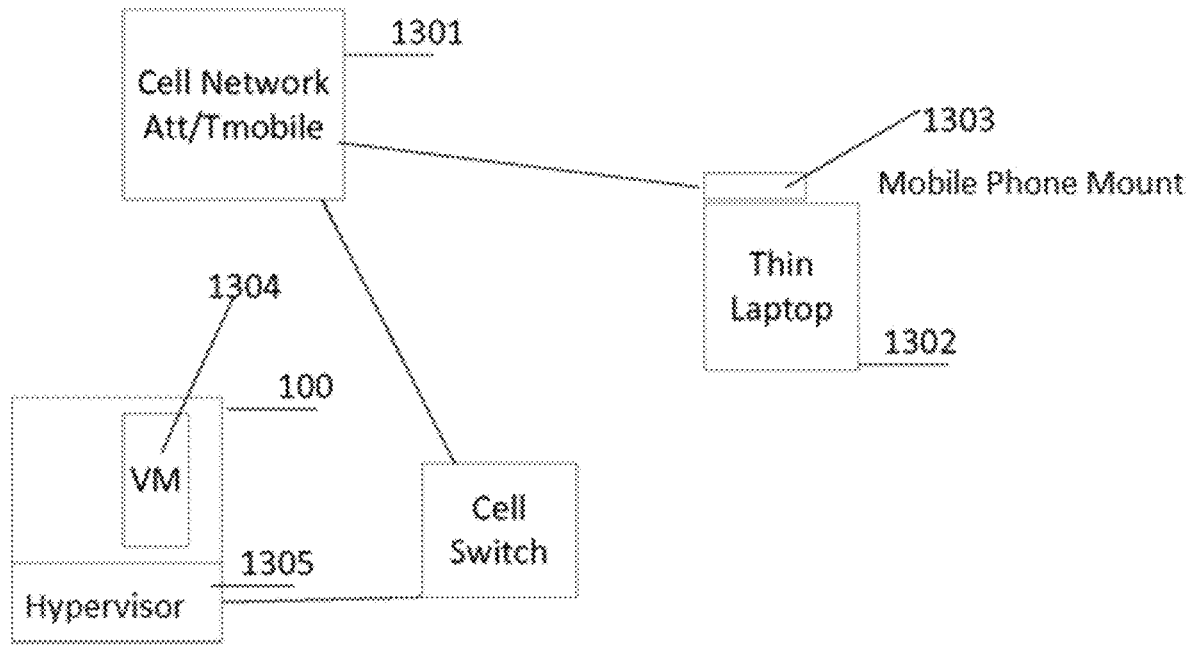
Figure 13: Thin laptop connect to guest OS with a mobile phone.

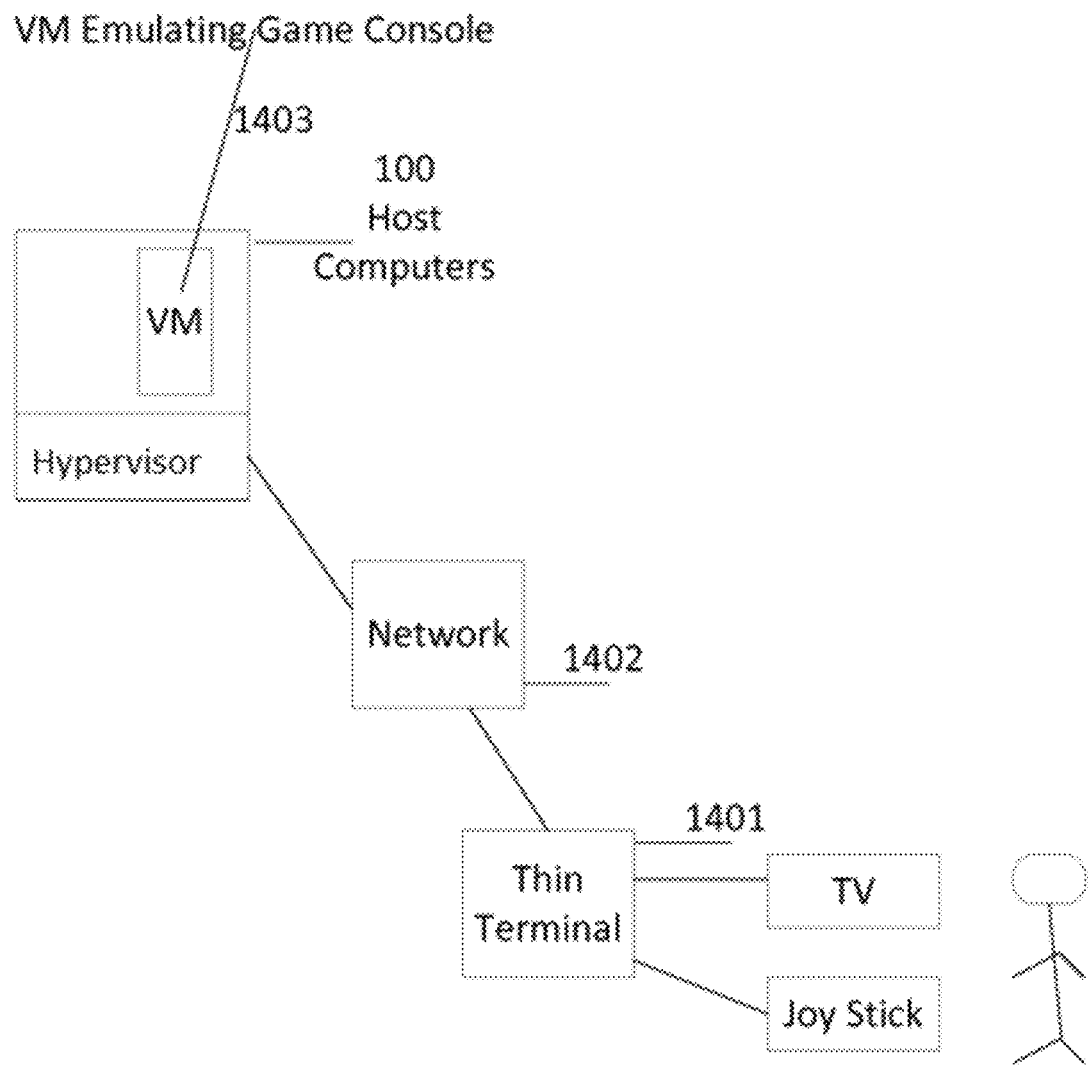
Figure 14: Thin terminal acting as a game console where game console environment runs on mini-cloud system or in the cloud.

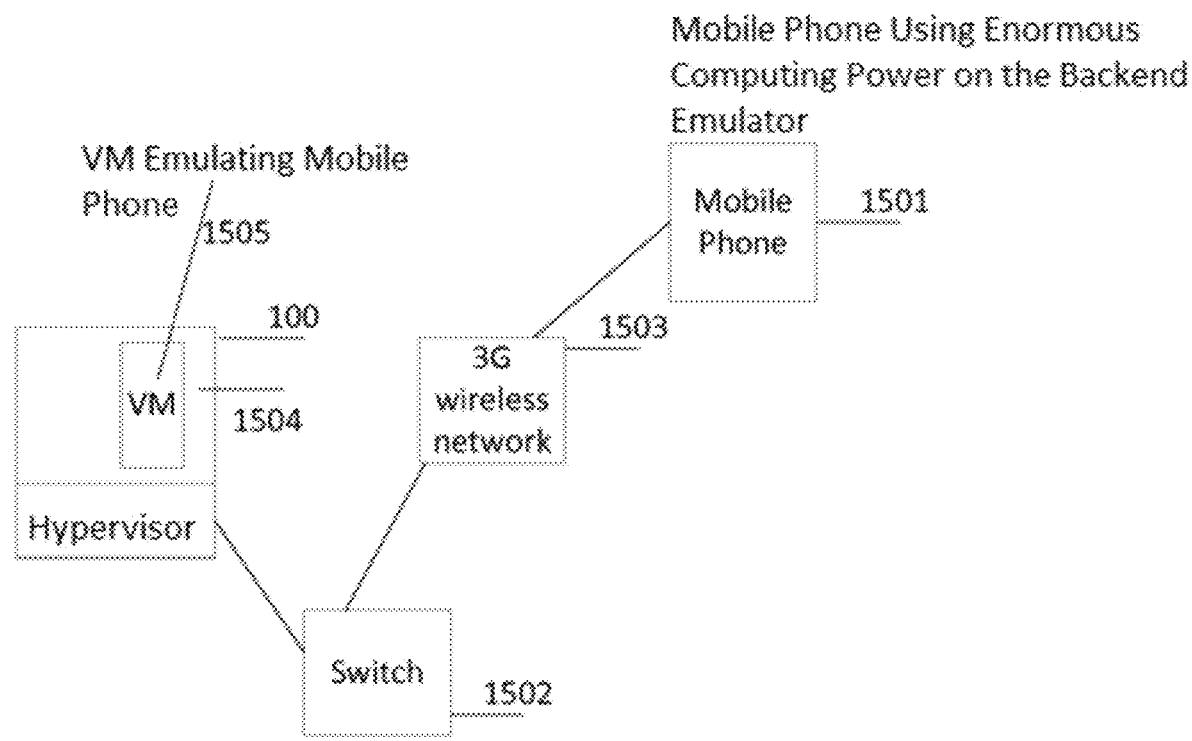
Figure 15: Mobile phones are being used as a thin terminal; a mobile OS environment are running on mini-cloud host.

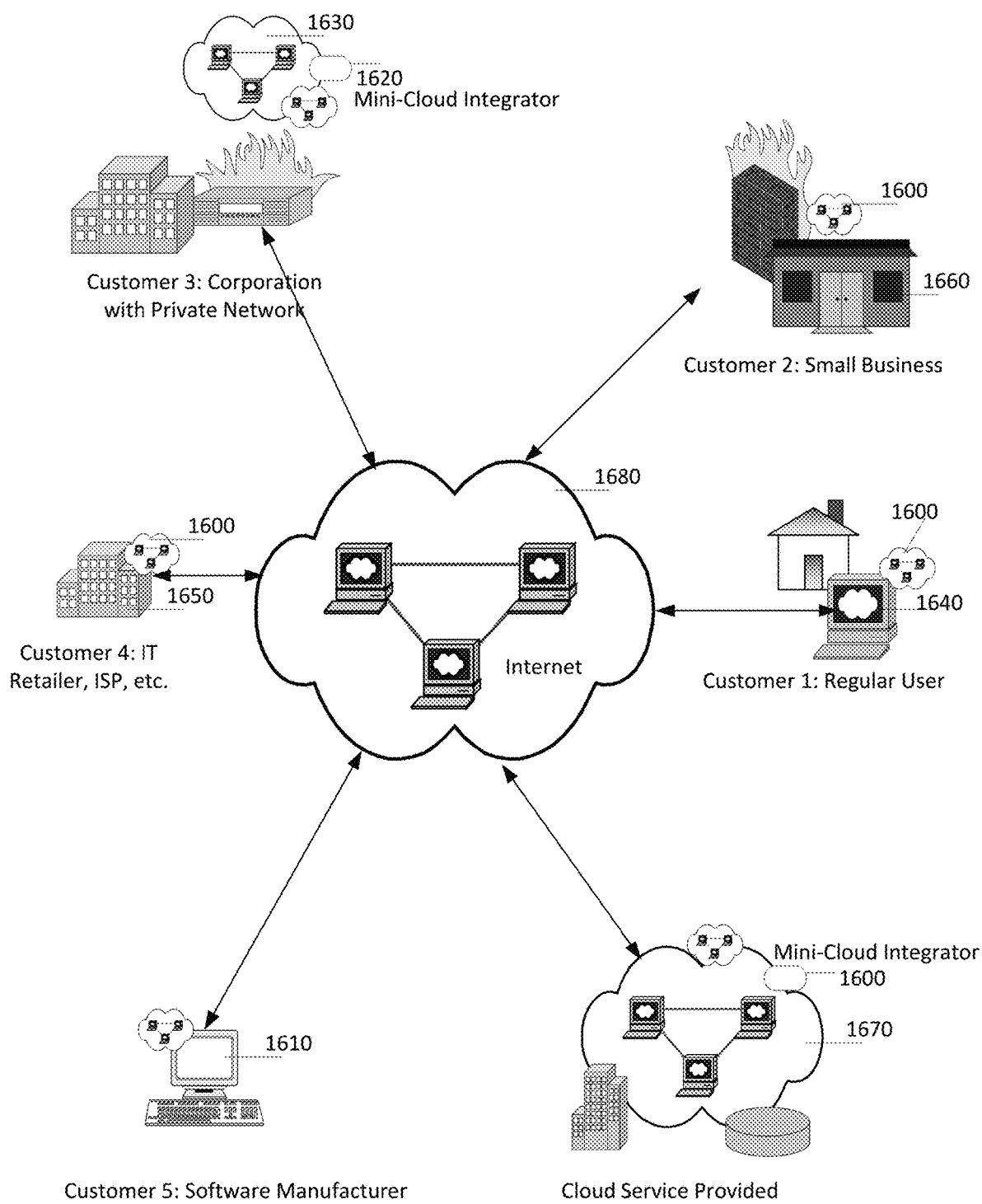
Figure 16: Mini-cloud-based cloud services.

Home User:
1. Subscribe to a suit of applications available in the cloud accessible through mini-cloud.
2. Cloud manages lifecycle of the application on users system.
3. Users can use those applications on the basis of subscription and without installation.
4. Cloud takes care of servicing of the application.
5. Users can try applications and buy them.

Cloud Service Provider:
1. Offer top-level cloud infrastructure; basically a collection of mini-cloud infrastructures with some tools and services.
2. Different parties add value-added services to the cloud
3. Cloud tools helps vendors to publish applications in the cloud.
4. This serves as top level cloud that eventually connect all mini-cloud pieces.
5. Software manufacturer submits any servicing request in the cloud and gets deployed across all clients.

Large Corporation with Data Center:
1. Corporation deploys private version of cloud in data center with mini-cloud in branch offices.
2. Mini-cloud at branch office communicates with the main cloud in data center through some private tunnel.
3. Mini-cloud can independently work for some services.
4. Application deployment, servicing, lifecycle management, licensing all managed by mini-cloud or main cloud systems.

Branch Office/Small business:
1. Subscribe to a suit of applications and infrastructure available in the cloud for small business.
2. Mini-cloud manages lifecycle of the applications and infrastructure for the users.
3. User can use those applications and infrastructure on the basis of subscription and without buying or installing.
4. Mini-cloud takes care of servicing of the application and infrastructure.

OEM/Software Vendors:
1. Software manufacturer packages their application to publish under the cloud.
2. Vendor can issue servicing request.
3. Vendor sets licensing policy for the cloud.

ISP, Retailer:
1. ISP can bundle the mini-cloud with their service to their client.
2. Mini-cloud H/W replaces modem at users site.
2. Retailer can deploy a private version of cloud to serve their own client.

Figure 17: Different users uses mini-cloud-based infrastructure and software as a services.

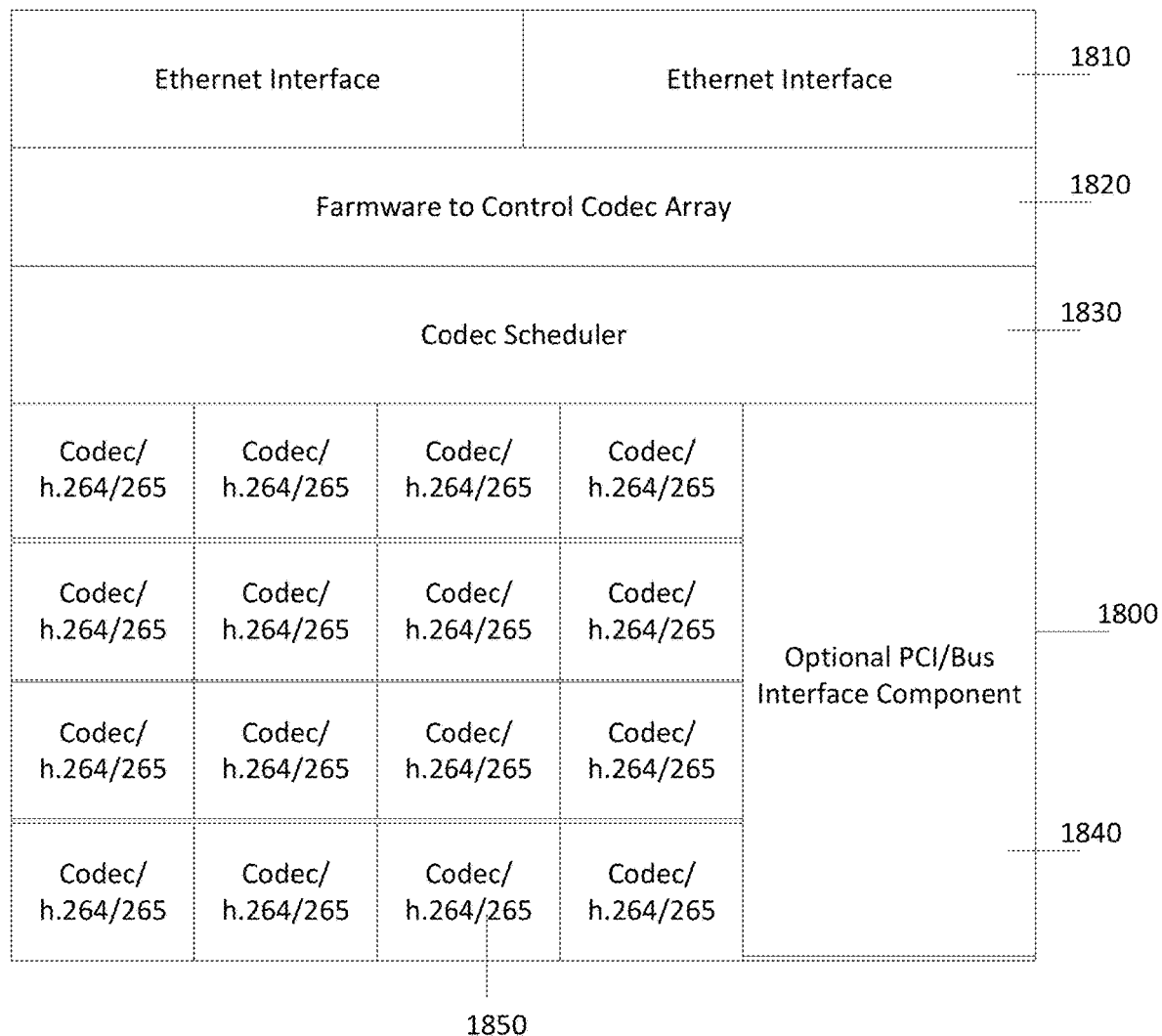
Figure 18: Mini-cloud codec array used in mini-cloud host or cloud infrastructure.

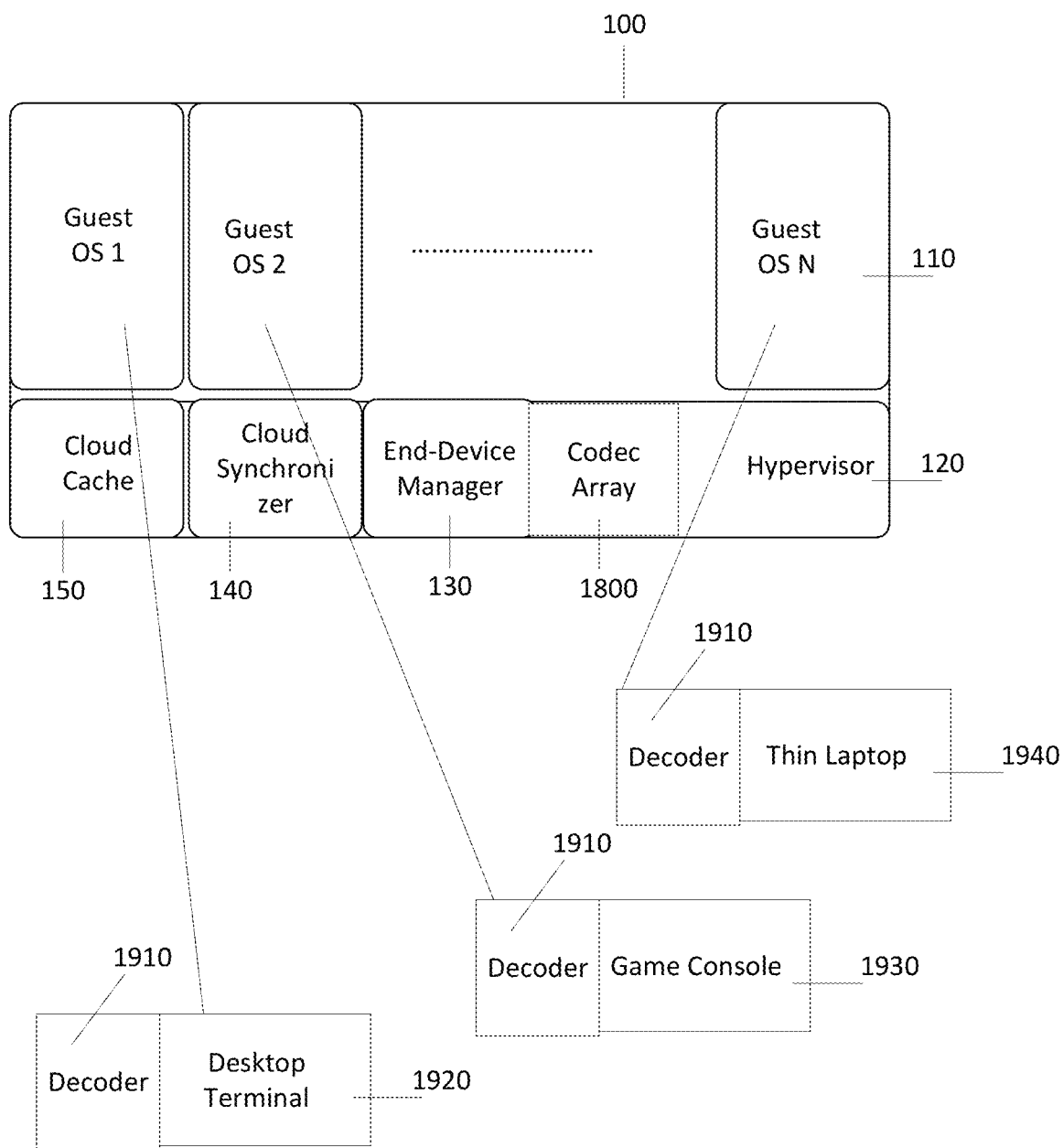
Figure 19: Mini-cloud host connecting different clients.

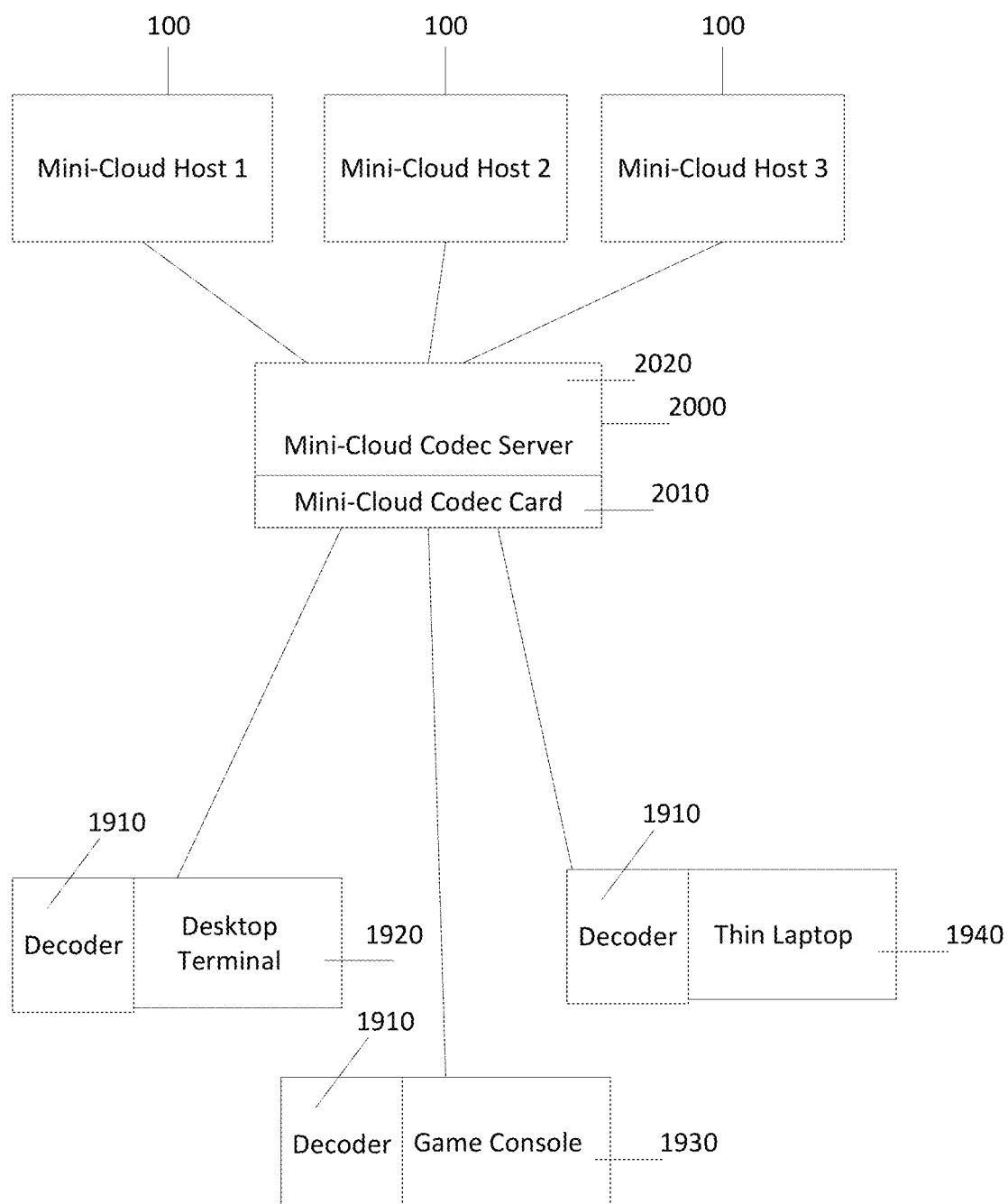
Figure 20: Mini-cloud encoder server processing display streams from mini-cloud host.

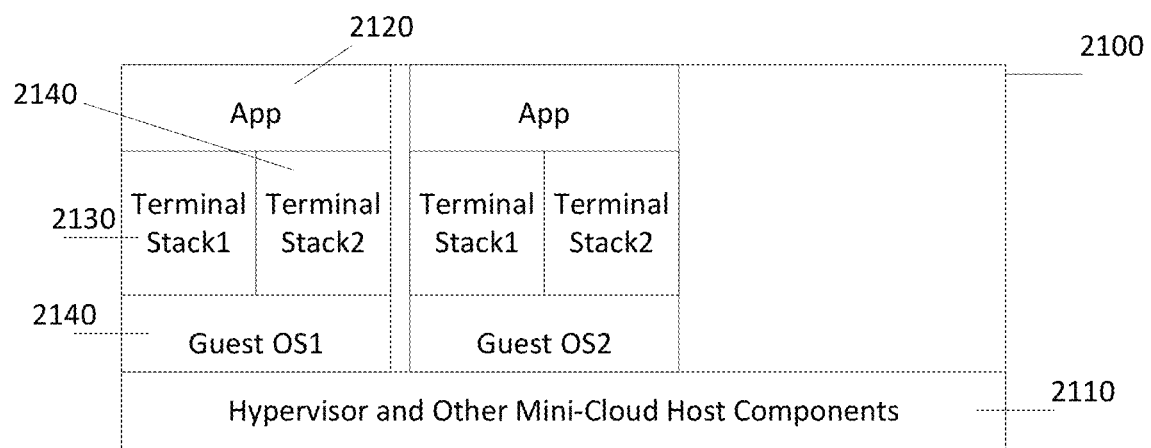
Figure 21: Mini-cloud VM guest with dual remote stack.

MINI-CLOUD SYSTEM WITH EMULATOR FOR ENABLING USER SUBSCRIPTION TO CLOUD SERVICE

CROSS-REFERENCE OF RELATED APPLICATION

This application is continuation of U.S. patent application Ser. No. 12/951,081 titled "System and method to support subscription based Infrastructure and software as a service" filed on Nov. 22, 2010; the disclosure of which is incorporate by reference herein. This application cross-references U.S. provisional patent application Ser. No. 60/985,210 titled "A Framework and Platform to Support Subscription Based Software Service and Information" filed on the 3 Nov. 2007; the disclosure of which is incorporated by reference herein. This application cross-references U.S. provisional patent application Ser. No. 61/263,411 titled "Home Access Gateway to Deliver Virtual Desktop to Home User," filed on the 23 Nov. 2009; the disclosure of which is incorporated by reference herein. The application cross-reference U.S. provisional patent application Ser. No. 61/291,916 titled "Thin Device to Deliver Computing Power," filed on the 3 Jan. 2010; the disclosure of which is incorporate by reference herein.

TECHNICAL FIELD

The present invention relates to a system and method that rearranges a modem or router and computer into an access gateway, then connects to a back-end service to transform computing platform into a subscription-based services.

BACKGROUND OF THE INVENTION

Internet has changed the landscape of computing environment in many ways. More conventional software applications such as e-mail word processing packages are becoming web-centric that can run on a computer without any installation. Smaller form-factor netbooks such as Intel atom processor-based devices and other thin devices based on ARM processor are becoming popular because those devices are more cost-effective and consume less power. There are some thin client devices as well that offer lock down environment. User uses those light weighted power-efficient devices for complementary uses along with their other heavy weighted desktop computers. Thin client are not yet there to replace full desktop. Users still need their desktop computers for CPU-intensive program such as video processing applications and games that need to deliver high-end graphics. With multiple devices, users eventually end up with more physical devices to meet their different use cases. Regular desktops at home are difficult to access from remote sites without paying a third party a service charge, consume a lot of power, and offer little backup disaster recovery support in the event of failure. The only way user can upgrade the system is by replacing the system.

Also, branch offices and small offices has similar need than that of a home user but in extended form where their computing needs need to be integrated into their head office or central infrastructure like data center or large service provider. Also, in case of small offices, their computing environment needs to be more elastic, expand, and scale on demand on matter of hours instead of weeks as it would take to procure new equipment.

Virtualization and cloud computing would start the next level of computing evolution. It brings a lot of computing benefit to end users, like elastic computing where more computing needs can be supported on demand. Cloud and virtualization solution typically try to centralize most of the computing needs into a data center or some locations controlled or owned by a services provider. Those kinds of centralization scale better with server-based web-centric computing. For consumer-centric computing where users need full access to a rich desktop or rich application that needs to deliver very high experience, those environments need to be created close to the users. Data-center-based computing might incur high latency to deliver high-end graphics.

It would have been nicer if users could consolidate some of their endpoints and have a better service that allow them to subscribe a computing space that offers the CPU power user needs and can scale up or down based on demand, can be accessed remotely from any point and accessible to users without needing any computer, and can be paid for just like a utility bill or bundled with ISP services. Here, we describe a new system and method to transform users' computing needs into a subscription-based services. The proposed method transforms a modem or a router into a mini-cloud virtualization host that is small enough to sit close to users' premise, at the same time work as a gate way to some central computing environment. Effectively, users get the flavor or cloud, with some experience as if needed infrastructure sits on-site or local. The mini-cloud gateway serves most of the users' computing need and access the cloud to support some needs that can't be handled with onsite resources. The system combines infrastructure, software, and digital content under the same subscription model.

SUMMARY OF THE INVENTION

The proposed invention outlines a mini-cloud system that rearranges a modem or router and computer into an access gateway, then connects to a back-end services to transform computing platform into a subscription-based computing model where software digital content and computing environment become another utility services like Internet services to end users. The new mini-cloud system serving as a consolidated access gateway works as a hypervisor host that runs one or more computing environments to deliver different computing services to end users including desktop, laptop, networking infrastructure, game, digital video recorder, media servers, etc. The mini-cloud system can connect to back-end services to bring more services that can't be served using onsite resources.

The simplest form of mini-cloud can be a modem with additional circuit and component to process thin client software like virtual network computing (VNC) client that would allow users to connect to another remote desktop managed by the Internet service provider that backs VNC server. When users power on a mini-cloud system, it automatically connects to remote desktop after some device level authentications. Users simply connect to their monitor to the mini-cloud system, which is just like a DSL modem, and get access to a full desktop.

For a simple mini-cloud system, the main element of this invention is a consolidated DSL router that combines router functionality and small computing functionality in the same box with ports to connect to a monitor and user input devices. The box becomes a smart DSL, or smart Internet access gateway. In simplest form of mini-cloud, effectively everything can be consolidated into a single chip in the form of system on chip (SoC) or implemented by a single-board computer (SBC) with a modem circuit. A more complex form of mini-cloud is a full-blown computer working as a hypervisor host capable of running few instances of guest OS called virtual machine (VM) with some supporting modules and circuits. The processor on a SBC is light weighted and can be used to process parts of modem operations in software. This would allow building a simpler modem circuit using the power of the processor in the box that can handle some functions related to the modem. SBC or SoC is capable to run VNC-like client software. SBC or SoC can be replaced by a new H/W that can implement a new protocol outlined in this disclosure.

A more complex form of mini-cloud system will have router components, such as a hypervisor host with multi-core multi-processor system that can host many guests computing platform. A mini-cloud system will have a sub-scription management application administrator so users can manage resources offered by mini-cloud systems along with more subscription-based resources mini-cloud system can access. The resources are defined as software, digital content such as movie, game applications, computing infrastructure such as a system with Intel corei7, computing platform such as OS with SQL and Windows 7, networking infrastructure such as 2 systems with a private network connection, etc. Since the amount of resources can be few in numbers to few hundreds or thousands in number with various types of resources, mini-cloud scales with different needs as it holds some resources locally and reach out to back-end cloud for more resources. Local resources might be more efficient, and different mini-cloud systems can be built with different set of resources.

The disclosure also includes an example implementation of Port Extension Protocol (PEP) to implement mini-cloud systems with terminals. The protocol shows that the various thin terminals can be supported with mini-cloud systems. PEP can be used in place of VNC or any remote protocol to handle terminal efficiently. PEP can be used in a two-tier solution where in the first tier, thin terminals are connected on premise mini-clouds with very fast network link and the communication over the first tier uses PEP. In the second tier, where thin terminal needs to connect to a back-end infrastructure over a slower link through mini-cloud system, the slower link might use another protocol or some varia-tions of PEP specifically designed for slower link.

The disclosure also includes a section to describe a software and digital content subscription framework. The framework simply implements an exemplary subscription model that can be integrated with mini-cloud system that allows a user to subscribe infrastructure, platform such as OS or database, software, and digital content using the same systems.

Few exemplary embodiments show additional operational steps and work flows to demonstrate the various capabilities of a mini-cloud system. Those sections also show how different thin terminals would work with mini-cloud systems.

BRIEF DESCRIPTION OF DRAWINGS

FIG. 1: A typical setting for home users using mini-cloud in place of a DSL modem.

FIG. 2: A typical setting for small business or branch office.

FIG. 3: Mini-cloud architecture.

FIG. 4.1: Cloud cache component.

FIG. 4.2: Mini-cloud host with thin client.

FIG. 5: Steps users take to use mini-cloud systems.

FIG. 6: Steps users take to use mini-cloud systems for home entertainment.

FIG. 7: Steps administrators take to set up branch office or a small office.

FIG. 8: Mini-cloud modem with USB-connected termi-nals.

FIG. 9: Mini-cloud modem with two terminals.

FIG. 10: Mini-cloud modem with terminal with projector.

FIG. 11: Mini-cloud modem with thin laptop.

FIG. 12: Thin laptop with a power adapter where the power adapter contains H/W enough to deliver laptop OS environments.

FIG. 13: Thin laptop connects to guest OS with a mobile phone.

FIG. 14: Thin terminal acting as a game console where game console environment runs on mini-cloud system or in the cloud.

FIG. 15: Mobile phones are being used as a thin terminal; a mobile OS environment is running on mini-cloud host.

FIG. 16: Mini-cloud-based cloud services.

FIG. 17: Different users use mini-cloud-based infrastruc-ture and software as a service.

FIG. 18: Codec array architecture used in mini-cloud or cloud infrastructure.

FIG. 19: Mini-cloud host connecting different clients.

FIG. 20: Mini-cloud encoder server processing display streams from mini-cloud host.

FIG. 21: Mini-cloud VM guest with dual remote stack.

DETAILED DESCRIPTION OF THE INVENTION

This section explains how the system would operate with some examples. In a typical business workflow, an ISP would manufacture a new set of DSL router or the Internet gateway and lease that to its subscriber as part of an upgraded subscription plan. The upgraded subscription plan contains the desktop service plan that would allow a user to connect a remote desktop using the DSL router in a trans-parent way so that the user will feel that the DSL router is in fact his or her computer. When a user subscribes in the plan, a technician would go to the user's home and install all the wiring and install the router. The user or technician will simply connect the user's monitor, keyboard, and mouse. The technician would create a user account with desktop service and configure it using the tool available from the router box. Similar tool is available on an online portal as well where the user can log-in and configure his or her desktop service plan.

On the back end, ISP will build its own data center or subscribe infrastructure from another provider. ISP will manage a broker service that would be the first point of contact when the user powers on the DSL router. The broker service will recognize which device is trying to connect and which user is registered on those devices. The broker service component would access the user's account, retrieve all the user's desktop configuration, create a desktop environment for the user that matches all the needed configuration, and allow the user to connect to the desktop using some protocol both desktop and DSL router client access program under-stand. The simplest embodiment might be that DSL router is running a Microsoft RDP client that connects to a server on the back end where the server is created and selected by the broker service.

When a user needs a more powerful machine, he or she will use some tool on his or her desktop or some ISP-provided portal to access his or her account and set that he or she needs certain configuration of the desktop for certain days. Every time the user connects to a remote desktop, a broker service checks those parameters, and if the user needs a higher-configuration desktop, it creates that for the user.

For better power management and efficient use of backend resources, which offers lower cost to the user, ISP might run many desktop sessions on a single server. Sometimes, light-weighted application can be launched such as web browser and e-mail application instead of launching the whole OS specific for the user. In some cases, some application can be launched inside the DSL router to leverage router resources even more. However, those operations are transparent.

In another embodiment, a company without having Internet service provider can offer the desktop services. In this, they can offer a gateway device without the DSL modem part. The device simply becomes a slim down version of the DSL gateway with some additional functionality. When powered on, it uses the existing Internet connection to connect a broker service managed by the company. The broker service creates remote desktop and delivers that to user.

In general, ISP or provider will manage its own data center for the infrastructure. The back-end infrastructure that supports remote desktop services is expandable. Any user or third-party company with high network connection can add some computer resources to the back-end infrastructure with a secure virtual private network and creating a virtual environment that can be managed remotely by the infrastructure provider. For example, a home user might have a powerful machine with 20 cores. It can create an environment that can partition his system and lease it back to the back-end infrastructure provider when the user doesn't need those resources. This becomes analogous to power generation where the home user can generate electricity and unused electricity can be given back to the main grid where the user makes money.

A subscription management component is used to manage subscription plans and resources in mini-cloud systems. This component can have management interface in mini-cloud system so that the user can interact to basic resource management. Subscription management components allow the user to create his subscription account, attach a leased mini-cloud system, create or provision new VM and attach to his subscription plan, add new software resources and attach them to a particular VM, etc. A billing component can look at the data in the user's account managed by a subscription management component and can suggest how much the user would need to spend based on the resources assigned to the subscription plan.

A billing component can look at the data of how many resources the user is using and how frequently he or she is using it and create a bill to be charged to the user.

Mini-cloud systems differ from other cloud systems like EC2 from Amazon or Azure from Microsoft. EC2 and Azure are kinds of one-tier solution where terminals are typically another computer equipped with full-blown operating systems and H/W that directly access cloud resources. Mini-cloud systems are a two-tier solution in first tier; it replaces a full computer with a terminal, while offering full computing power. In the second tier, those terminals can access back-end cloud resources. Those back-end cloud resources can be provided by EC2 or Azure. So essentially, mini-cloud is a complementary solution to EC2 or Azure.

Detailed Description of the Invention with Figures

Figure one shows a typical setting of how a mini-cloud can be used in a home environment to serve the computing needs of a home. A typical home can have several computing devices such as laptop, desktop, digital video recorder, tablet devices, kids' computer, and game terminal.

Block 100 represents mini-cloud devices, mini-cloud center, mini-cloud host, and mini-cloud emulator as referenced in this disclosure. This works as a bridge between the back-end cloud represented in block 600 and all different terminals such as 200, 300, 400, 700, 800, 900, and 810. The architecture of this block is described in a later section.

Block 600 represented the actual cloud that offers more infrastructure resources and management solution not available in mini-cloud center. Mini-cloud center can be considered as an infrastructure cache where majority of user's infrastructure needs are supported locally and reach out to actual cloud when need can't be full filled. Block 600 is a collection of many units of mini-cloud centers with more management pieces. It contains a subscription management application user can access.

Block 610 represents a subscription management application that can be as simple as a web application. The user can access the application from any computer or using any thin terminals. To access the application, they will simply sign in using their credentials. When the user makes a subscription from a cloud service provider, he or she needs to assign at least one mini-cloud center whose profile would be stored in a database. Management app accesses profile database to retrieve associated mini-cloud center configuration and uses those information to decide on an infrastructure subscription needs.

Block 200 represents a thin laptop that can replace a regular laptop. Thin laptop contains just display screen and input pads. Main laptop storage, CPU, is not needed and that reduces the weight, power rating, and price significantly. Also, thin laptop doesn't need any motherboard. It just needs a wireless or networking stack to connect to mini-cloud host. Since it doesn't need any CPU or storage, it can run for a very long time. Also the processing power of thin laptop is not limited by its own CPU rather it consumes CPU on mini-cloud host.

When user press on power button on thin laptop, it tries to run a small configuration program for the first time. The configuration program wouldn't run subsequently if no change in the environment is detected. Configuration program would try to set up its connection and discovers mini-cloud host automatically using some protocol that both thin terminal and mini-cloud understand. The auto discovery part can be skipped if the mini-cloud and terminals are preconfigured to communicate to each other once they are within communication range.

Once the thin terminal connects to mini-cloud host, it will try to authenticate that the device is allowed to connect. Authentication part can use some device ID or terminal ID. The authentication process can also ask the user to add some password. Once the device is authenticated, the device requests mini-cloud host to give a list of computing environment it can connect to unless it is preconfigured in a policy that tells a particular thin laptop can connect to a particular VM running on the mini-cloud host. If no computing environ exists, mini-cloud can create a new computing environment and attach to the thin laptop. The creation part of the VM is guided by a template and policy that dictate how the end VM would look like.

Once the thin laptop connects to the VM, the user gets its typical log-in screen like Windows and the user uses them as if he or she is using a regular laptop.

Block 300 is a terminal for a desktop that works very much the same way as block 200 thin laptop does.

Block 400 represents a tablet terminal that differs from thin laptop by its form factor. A tablet typically uses its screen. As touch screen input devices, it might need different computing environment for its usability issues than the typical laptop or desktop. For thin tablet, mini-cloud host would simply create a virtual environment that works better with the display and inputs the tablet has. Block 400 can represent a mobile phone as well where it connects to a virtual mobile OS environment running under emulator on mini-cloud host.

Block 500 represents connection between mini-cloud center and back-end cloud. The connection can be a regular DSL line, fiber-optic line, or even a wireless connection. The speed of the link will be used to decide what environment can be run on mini-cloud center and what can be pushed to cloud. A slower link might force to use more infrastructures locally that might suggest user to install or lease high-end mini-cloud center with more capability.

Block 700 is a TV terminal that can connect to other terminal such as block 900 representing DVR and block 800 representing game terminal. In another embodiment, block 700 can contain enough circuit to replace a game terminal or VDR terminal.

Block 800 is a game terminal that works very much the same way than how other thin terminal works. Game terminal simply replaces PlayStation or X-Box kind of devices from living room making the footprint very small. Also, a single terminal can connect multiple game environments that allow a user to run both X-Box and PlayStation games without buying two separate game consoles. The way game terminal works is like this: at power on, it connects to a game environment running on a mini-cloud device or in the cloud represented in block 600. The user subscribe his preferred gaming environment using a subscription management program that can be as simple as a web page that allows the user to choose certain plans, configuration options, and deployment environment. The game environment is deployed by creating its OS image on mini-cloud, if it has enough resources, or in the cloud (600). The terminal simply tells the game environment that all display output and joystick or input need to be mapped from the terminal. The game or game console management app run on the back end, display is encoded, then sends it over to terminal that decodes the display and dumps them to TV terminal. User uses joystick connected to game terminal to choose the game it want to run by watching the output from the TV screen. Then all controls are sent back to the game environment on the back end that eventually responds to any user inputs.

Block 900 represents a digital video terminal that can replace existing DVR terminal or dish terminal. It runs a VDR environment on mini-cloud devices or on cloud (600). In this case, the DVR environment on the back end receives all the streaming data coming from a satellite receiver or from another streaming server. Mini-cloud box include an interface so that it can connect to a receiver for any data that is dumped to TV terminal. Set-top box manufacturer can create a computing environment with additional interface card that can be integrated with mini-cloud center so that setup box functionality can be realized with a combination of DVR terminal and mini-cloud center.

Block 810 is a custom terminal that can represent any custom devices that need a computing environment that can be pushed in the cloud and a display environment that user need to interact.

FIG. 2 represents few blocks ideal for a small office environment that might have few mini-cloud centers deployed on premise. Those mini-clouds communicate with each other to share its local resources. It's possible to have multiple segment of network within an organization with different zoning. The administrator might choose to deploy different mini-cloud center with different capabilities in each of those zones. Each mini-cloud center might serve a set of users with more commonality, for example, a set of people works in a particular department using a single application or computing environment. Most likely, thin terminal in such environment will be deployed using some network infrastructure with high-speed local connection and mini-cloud might not need to work as a router or network hub as it was in home environment. The resource requirement in such environment would be more geared towards multiple seats of the similar terminals as opposed to many diversified terminal in home users case.

FIG. 3 represents mini-cloud architecture. Mini-cloud works as a hypervisor host that can run multiple computing environments. For example, a simple mini-cloud center can be a simple computer with Microsoft Hyper-V hypervisor or any other hypervisors that allow to run multiple instances of different operating systems on the same system. The simple mini-cloud center also includes an end-device manager to manage all thin terminal connected to it (block 130), a cloud cache (block 150), and a cloud synchronizer (block 140). Multiple operating systems (block 110) can be run on them.

Block 120 represents hypervisor that allows partitioning H/W resources and assigning them to individual guest computing environment. A customized version of available hypervisors such as EXS from VMware, Xen from Citrix, or Hyper-V from Microsoft will do the work. With hypervisor console, a user can create a guest operating system VM using some template, boot the VM, power down VM, assign private network interfaces, etc. Those administrative works can be done automatically where subscription manager can create appropriate VM on a mini-cloud host that complies with the user subscription plan. While creating a VM, the creating step can use some template or preconfigured VM image from cloud cache (150). There are Type-1 hypervisor that refers to Microsoft Hyper-V and similar products. Type-2 hypervisor is another kind of hypervisor that might allow running more virtual environments even if the underlying hardware can't run instructions in virtual environment without some additional translation of instruction. Cloud-host need to support desktop terminals along with mobile devices and hence might require both types of hypervisors as needed for a particular embodiment.

Block 130 is a component called end device manage that would run in hypervisor environment even when no guest OS is running. This component manages all thin terminals, authenticate them, allow access control to mini-cloud resources, and offer some management interfaces accessible using thin terminals. For example, when no OS guest is running, thin terminal still needs to start the intended computing environment, power down, attach/detach, etc. End-device manager uses some protocol to identify some signature embedded in tin terminals sending some queries. The device manager can talk to other device managers in the network on some components in the cloud (block 600), or even subscription manager (block 610). When the device manager works in collaboration with cloud, it simply works as a broker.

Block 140 represents a cloud synchronizer that updates mini-cloud cache data and deletes contents when needed. Cloud synchronizer can work with digital right management as well that dictate what content can be copied over and how long it can keep. It also enforces policy-based compliances.

FIG. 4.1 represents internal components of a typical cloud cache component (150) in mini-cloud. The data kept in cloud cache are kept in encrypted form to preserve data security and integrity whenever needed.

Block 151 represents device-specific cache where mini-cloud needs to support a range of devices laptop, desktop, tablets, mobile phone, and game consoles. All those devices might need separate computing environment. So there would be some cached data specific to a class of devices. Those cached data will be used to create and manage a device specific environment more efficiently.

Block 152 represents a cache integrity checker that checks data integrity in real time when a particular event occurs like create a VM. The checker also check data integrity and schedule managed by cloud cache manager to make sure data used in cloud cache are up to date, compliant with law, and are not tempered. The integrity check works on all cached data stored in various subcomponents in cloud cache.

Block 153 represents cache life cycle manager that makes sure data reside on cache for a specific period of time that is complied with the subscription policy. For example, if a user subscribes a VM for one month, after one month, some data need not be there, and life cycle manager can delete/purge those data after some time, say 30 days after expiration.

Block 154 represents a peer cache manager that interacts with other cloud cache in different mini-cloud it can reach. When a request on a cloud cache requires some data that is not present in local cloud cache, it can contact other peers to bring those missing data.

Block 155 represents media cache that holds some data related to multimedia content such as an e-book, movie file, game, and song. The user should be able to subscribe that content and play them on TV terminal using some thin terminals. Those media cache might be accessible to other cloud cache through peer cache components.

Block 156 represents cloud cache manager that schedule subcomponents in cloud cache to perform some tasks and work with other cloud cache manager to collaborate.

Block 157 represents cache catalogue that contains what information are available in local cache and what can be brought in from actual cloud (600) or from other mini-cloud cache. This catalogue is updated regularly.

Block 158 represents app library that holds data for software applications. When a user subscribes software applications, it can be deployed on a VM if the software application data exists in app library cache.

Block 159 represents image library cache that holds template files for creating actual VMs. For example, in a small business environment, they might use only three flavors of operating systems, it might make sense to keep a library around 10 GB holding some images so that those three OS environment can be created any time without bringing much data from central cloud that improves performance. Also, users might move from office to office where a VM running on one mini-cloud can be transferred to another mini-cloud by transferring differential data. With those differential data and using data from image library cache, the actual VM can be created with a fraction of data movement. This might help backup and recovery as well.

In general, cache data in other subcomponents also help to move less data utilizing bandwidth.

FIG. 4.2 represents how a mini-cloud host talks to different components in a thin terminal or another mini-cloud running in the cloud (600).

In the figure, block 100 with hypervisor (120) represents a mini-cloud running in the cloud or on premise. A block 100 with modem circuit (186) represents a smart modem mini-cloud that contains built in terminal.

Users buy or lease such smart modem from an ISP and can connect users' keyboard/mouse/video to a desktop computer running in the cloud. Smart modem has a firmware that might hold just enough functionality users might need to do some internet browsing or e-mail checking. Smart modem also includes router (189) that allows user to connect their other networking devices using wire or wirelessly (block 187).

On power on, users are given a management console that holds some basic software apps. If users need more powerful computing with more apps, they can connect to a back-end desktop environment running on mini-cloud. When users connect to a remote VM on mini-cloud, smart modems, keyboard/mouse (block 183), USB (block 182), audio (block 184), and video port are redirected to the VM. Users can choose the VM settings by interacting with the subscription manager.

FIG. 5 shows some steps a user takes to use mini-cloud systems.

FIG. 6 shows some steps home users might take to use mini-cloud system for home entertainment.

FIG. 7 shows some steps a user might take to perform some administrative task in a small office or branch office environment.

FIG. 8 shows how a mini-cloud system can connect more thin terminals over single USB connection. This setting works very much the same way as described in FIG. 4.2 where the communication link (block 191 in FIG. 4.2) is replaced with a USB link. It's possible that the link can be wireless or Ethernet. The benefit of using Ethernet cable is that no power source will be needed to run the terminal. Power over Ethernet will enable more terminals as well.

FIG. 9 represents mini-cloud connecting to one terminal where another terminal is connecting to the first terminal. In this setup, the first terminal expose a USB hub to extend USB connection second terminal can use.

FIG. 10 represents a novel cloud terminal connecting to a mini-cloud system. The difference of this terminal with other terminals is that this terminal doesn't need any display monitor. The terminal contains a projector at the end of a flexible body mounted on a base. The terminal exposes itself to the VM running on mini-cloud system by redirecting all its ports including display. The VM running environment is projected on a regular surface used as a computer screen.

FIG. 11 demonstrates a thin laptop connected to a mini-cloud system. The thin laptop works as a thin terminal with display, keyboard, mouse pad, and a communication chip. On power on, thin laptop port is exposed to a guest VM running on mini-cloud system. Mini-cloud system detect the thin laptop terminal and launch appropriate thin laptop environment and connect the laptop terminal to the running VM.

FIG. 12 demonstrates a thin laptop terminal where a scale down mini-cloud system is embedded inside power adapter. The scale down mini-cloud can be a simple computer with some extra components so that it can connect laptop ports as its local ports.

FIG. 13 demonstrates a thin laptop environment where the laptop directly connects to a mini-cloud system running in the cloud and use 3G/4G or WiMax type of connection to connect the VM.

FIG. 14 demonstrates a thin game console that connects to a mini-cloud system to deliver a game console environment. In this scenario, the game console works as a thin game terminal. The terminal has ports that allow connecting to TV the joysticks user can use to interact with a game console environment that is running in the cloud on an on premise mini-cloud or in actual cloud in the back end (block 600). The game console environment simply sees all the ports on terminal as if they are connected locally and run game as is. It is possible to run some additional client on game terminal that would allow running the game session just like a remote sessions. In that case, all the graphics from the remote game environment would be captured, encoded, and compressed as appropriate and send it over to client running on game terminal. The client then decodes and decompresses graphics data and display on TV terminal connected to game terminal.

FIG. 15 demonstrates a mini-cloud environment where mini-cloud runs an emulator that runs actual mobile environment. That emulator can work as a type-2 hypervisor that runs an environment not native to host H/W. For example, type-1 hypervisor used in mini-cloud system runs guest OS platform that can be supported natively. It means guest VM is, for example, x86 where host supports X86 instruction natively. Or an Intel corei7 can be used as hypervisor host with a type-1 hypervisor such as XEN or Microsoft Hyper-V that runs guest OS with x86 image type. On the other hand, type-2 hypervisor emulates instruction from another platform such as RISC. A mobile device might not use x86 platform rather it would use ARM-based processor that need to be emulated on x86 environments. A mobile device as shown in block 1501 connects to a mini-cloud (block 100) system over a wireless network (block 1503). The connection might go through some cell infrastructure (block 1502) before hitting mini-cloud system. The mobile device can run small software client that can expose its port to a VM (block 1505) after communicating with mini-cloud. The VM (block 1505) does understand the form factor of mobile devices and simulate the exact working environments and display all the output to the mobile phone. The client on mobile phone then brings the mobile display from VM to local display user can interact. This would allow having two parallel mobile environments that can serve many purposes like one secure mobile environment to access office data that always lives in office environment and wouldn't impact if mobile phone gets lost. The second advantage is that the computational power of mobile phone is not limited to the mobile phone itself and can deliver enormous computing power without burning local battery.

FIG. 16 demonstrates a mini-cloud-system-based software subscription model.

Block 1600 represents a mini-cloud system used at various types of user and provider locations. Those mini-cloud systems have some agent running on each guest VM mini-cloud hosts. Those agents control what software can be deployed on a particular guest VM or what kind of digital content can be played on those VM. Mini-cloud system provides a framework to run software and digital content on any platform guest OS backed by mini-cloud system. The agent can use content streaming or software streaming that could install software on demand by bringing necessary files or content from local cache from mini-cloud or from some central library in the cloud.

Block 1610 represents a software manufacturer or content owner who packages their product using some publishing tool and publishes in the content cloud (block 1680) so that other users can use the product. The publishing tool can convert the software package in a format that can be deployed on a system using software streaming technology. Software streaming technology has various forms but the key idea is to create an installation package without installing on any operating system. The package can be deployed as a virtual appliance where a user creates a VM that has installed application. The user simply subscribes the VM for a specific time. Once the user subscribes the VM, it can be deployed on the user's mini-cloud system. The VM can run ISP infrastructure as well where use connect to it remotely. With streamed app, user's subscription plan allows him or her to install the app for limited time using some agent the user has on his system and managed by mini-cloud system that enforces licensing.

Block 1620 represents a component called mini-cloud integrator that has various subcomponents that run in mini-cloud system at hypervisor, inside guest VM, and in cloud in ISP backed infrastructure. This piece helps to integrate VM in a better way with mini-cloud systems by sharing resources more efficiently.

Block 1630 is a collection of mini-cloud systems deployed in corporate data center. Mini-cloud systems deployed at different branch office as shown in block 1620 always contact block 1630 for any additional resources before hitting any cloud outside corporate network.

Block 1640 represents home users and block 1660 represents small business users. Both those users have mini-cloud systems on premise. Those mini-cloud systems has a mini-cloud software subscription integrator that run on mini-cloud core (independent of VM) and run inside the VM that run on mini-cloud. That subscription integrator enables software subscription on any VM running on mini-cloud through system.

Block 1650 represents a large enterprise that doesn't have private data center, but uses mini-cloud system for its local needs and communicates with block 1680 for any software and content needs. That customer also can contact ISP block 1670 to use more infrastructure resources as needed.

Block 1670 is a mini-cloud-based infrastructure provider that has a collection of mini-cloud systems. Some users small-scale mini-cloud can use more resources from block 1670 based on subscription model. Those infrastructures can host a VM that contains software the user can subscribe and connect to the VM. Users on premise mini-cloud can bring the VM locally if resource allows. To bring the VM, the system need to copy all image data rather the differential data that will allow on premise mini-cloud to recreate the VM using its image library or cache data.

Block 1680 represents digital content cloud. Any system running in the mini-cloud environment can communicate with block 1680 for any digital content and software needs. What a system can view and use is dictated by subscription plan. Content owner can publish their content in the content cloud so that users can subscribe and use them. The mini-cloud system helps to make sure only authorize users can use contents backed by users subscription plan.

FIG. 17 explains how different users use a software subscription model using mini-cloud systems. The software subscription part can be used outside mini-cloud system. However, the benefit is that mini-cloud can help to move VM more quickly, enforce licensing policy more easily, and manage life cycle of the content.

FIG. 18 represent a special card mini-cloud or similar system can use. The card uses some special purpose chip that can encode graphics stream from a VM more efficiently. The idea is a remote display whether that is within few feet within the physical location of mini-cloud system running VM or hundreds of miles away, the data between display and VM need to be transmitted in a scalable way. A HD dual-monitor system can easily require more than 5 Gbps link. Processing that massive amount of data will require a lot of resources. Rather, the data would be encoded using special chip and decoded on display or thin terminals using another chip. Those chips can be digital signal processor-based micro-controlled, some ARM-based embedded system. The special card in the picture can be a PCI-based card that can be inserted into an existing mini-cloud system. The card has multiple chips capable of handling multiple graphics stream from multiple VM running either on its own system or coming from another mini-cloud system. Once graphics data are encoded, they are sending over to thin terminal that can consume as low as 10 Mbps.

Block 1810 represents network interface module that allows the system to communicate with thin terminals connected to mini-cloud. The network interface module also can collect data from other mini cloud systems. The interface module can work independent of the interface card mini-cloud systems has.

Block 1820 represents a firmware or an embedded OS that allows controlling the resources on the card. The firmware can be updated and can be managed and controlled by an interface module in mini-cloud system.

Block 1830 represents a codec scheduler that allocates which chips are available to handle incoming requests.

Block 1840 represents an interface module to interface with a mini-cloud system bus. If the card is inserted into a PCI slot of mini-cloud systems, the module would handle communicating with the bus.

Block 1850 represents actual chip module that can handle a graphics stream. The card can have multiple chips. A mini-cloud system can have multiple cards as well. Those chips can be FPGA based or use DSP module. Those chips can use some processor core such as ARM. Optionally, those chips can contain GPU module that can allow the card to expose GPU to a guest VM. If the chip exposes itself as GPU module, then VM can directly send graphics commands that can be handled by the chip. The encoder in those cases can decide how to handle the command while communicating with a remote terminal who might understand the commands. By default, the chip would encode the data in some format like h.264 and send it over to thin terminal that then decode the stream and present to users.

FIG. 19 explains how different thin terminal connects to mini-cloud systems and how they work, in the figure, one desktop terminal (block 1920), game console (block 1930), and thin laptop (block 1940).

Block 100 represents a mini-cloud system. Most of the subcomponents inside mini-cloud systems (block 150, 140, 110, 130, 120) have been explained in previous figures.

Block 1800 represents codec array that has been explained in the previous figure as well.

The entire terminal contains a decoder component that can decode encoded graphics and commands from mini-cloud systems.

A typical operational workflow is as follows: the user powers on a thin terminal, say thin laptop, then he or she connects to a mini-mini cloud (100) over wireless or wired connection on USB cable or Ethernet cable. Mini-cloud detects the device and figure out it's a thin laptop should connect to a VM represented in block 110. If the VM doesn't exist, mini-cloud would recreate that using its image library and cache data. Once the VM is up and running, it connects to the thin laptop. All the graphics from block 110 are sending over to block 1800 for compression and encoding. The encoded stream might include other stream redirected to other ports such as USB. The encoded streams are then sent over to the thin laptop. The decoder component (1910) then decodes the stream and display on user's LCD monitor of the laptop. The user can see the display and interact with it, for example, typing username a password. Laptop terminal captures users input and then sends it over to block 110. The connection between mini-cloud and thin laptop can be done in many ways. All the port can be redirected using some bus level protocol that can expose port attached to thin laptop as if they are connected to block 110. USB over Ethernet can serve the purpose where all those ports are exposed as local USB devices to 110 with (a) USB keyboard, (b) USB mouse, and (c) USB display. Once guest VM (110) interacts with those USB devices, USB packets are intercepted, then encoded and send over to thin laptop. Many other approaches can be taken.

FIG. 20 represents a mini-cloud system that includes an encoder server. Encoder server can be a standalone server capable of encoding multiple computing sessions from different mini-cloud systems. A computing session from a VM includes graphics, data redirected to ports etc. Mini-cloud codec server can use the codec cards describe in earlier figures.

In the figure, block 2000 is the mini-cloud codec server accepting computing stream from multiple mini-cloud host running multiple guest VM. Then the codec server sends over encoded computing stream to individual thin terminal. The codec server simply helps mini-cloud system to scale better in large environments.

FIG. 21 represents architecture to support multiple client terminals. For example, if there are some VM in mini cloud system, the user can connect to them by terminal. However, the user might want to connect to them by other clients like VNC or RDP/ICA clients. In such cases, the guest VM will create one additional stack to support those clients. Guest VM running on mini-cloud system can include server stack needed to support those clients.

In the figure, 2130 is the stack needed to support thin terminal. The stack might include graphics stack, keyboard stack, and mouse stack that can communicate with ports connected to terminals. For example, if USB over Ethernet technique are used to connect those ports, 2130 would include one special USB host controller that would be a bus driver on Windows platform. All those remote ports will be attached on the bus driver so that the guest OS see them as a locally attached devices.

Block 2140 represents VNC and others stacks need to support remote VNC and other clients.

Port Extension Protocol and Devices to Realize Mini-Cloud System

Following sections provide description of a protocol to extend computer ports called PEP that can be used in mini-cloud system; one of many ways mini-cloud system can be implemented. The protocol has been described here in mini-cloud independent way so that someone can implement them without needing mini-cloud system.

There are existing protocols, such as Microsoft RDP, that allow a user to access a remote computer from a local computer, and then run a software client. Sometimes, the local computer can be thin enough to run just the remote client software. The client captures user inputs and, just like keyboard and mouse, sends it to the remote server where the actual program runs. The server component captures the graphics display part and then sends it over to the client to be displayed to the user. The problem with this approach is that it is very implementation specific and OS specific such as RDP server is only supported on Windows, and the client needs another computer to run their software.

PEP extends local H/W port, such as USB, to a remote location using a cable or some other medium, by transmitting packets that go through the ports. This approach would effectively move an H/W piece from one location to another. The H/W connected to such port will sense that the port is connected to it locally and run all the software applications recognizing those ports as a local one. A management component will identify group of ports and assign to the appropriate computer module. The appropriate computer module can be a VM running or a hypervisor such as Hyper-V from Microsoft. The management component can be a brokering service working like a switch box that connects a set of ports on one side and a computer to another side. The management component can be implemented in software by virtualizing the ports or using H/W working like a switch box. In this approach, the port extension is totally transparent to the actual computer. Keyboard, mouse, video, audio, etc., are connected to individual ports and those ports are connected to a remote computer through the switch box. Ports and management component will have a hand/shaking mechanism so that it can identify a group of ports or can create a group of ports from a list. That group will constitute the work station for a particular user. A port can add a unique ID such as a station ID to the device identifier, for the device connected to the port. The management component can also filter that identifier out. For better integration, the management component can have a module running inside the computer where some filtering, encoding, and decoding can be done.

PEP protocol can work without modifying guest operating system at all and doesn't require any CPU or computer on the client site. Therefore, it offers great benefit to end users. The protocol will work like a PSTN phone system where a home user gets a telephone port (outlet) that is connected to other users going through multiple switch boxes. PEP can work in similar fashion, where there is a computer on the other end. The home user gets a port that can be extended further with a port HUB, and the user can connect multiple devices. Packets from those devices are sent back to remote computer where the remote computer recognizes those ports as connected locally. The management component can have multiple layers, where multiple switch boxes get in its way before connecting users port to an actual computer. Multiple layers can use some additional protocol to compress data, encrypt it, or manage it for better optimization and security.

PEP works with multiple port hubs that are connected in chain fashion where each port hub will reroute packets for the next port hubs, thus high bandwidth will not be limited by distance end to end but distance between two port hubs. Also one port hub is connected to a port say "P1" on another hub where P1 simply pass through the channel, thus any port hub connected through the hub chain is still detected by the host computer as if it is connected without any port hubs. Just as a note, port hub simply extend one port to few more port, can have its own power source, and each port exposed by port-hub works the way as if it is exposed from the host computer where the port eventually connects to.

CPU-Less Laptop Using PEP

A laptop computer system is designed to include an LCD monitor and keypad connected to an internal USB hub kind of circuit. The monitor display is optionally connected to the hub through a graphics adapter. The hub's upstream port is connected to a transmitter that transmits USB packets over wireless networks, using protocol such as 3G/4G, WiMax, or Wi-Fi protocol. The internal USB hub can transmit USB packets over IP networks, or using a USB cable connected to a host PC at a local or remote site. For wireless setup, the receiving end of the USB packet eventually connects to a USB port of a host computer through another USB hub, or directly. When the setup is complete, the host computer sees the remote USB hub in the laptop just like a local USB device. A software component transparently handles converting all the remote USB packets into local USB packets to create an illusion, so that the host PC thinks all the devices are connected to its local USB hub. The software component also modifies USB packets with an additional signature so that host PC can identify a unique USB device when multiple laptops are connected to a single host PC. The laptop can be physically connected to a host PC using cable. The laptop's wireless component, and other configurable components, is programmed to connect to a host PC using a software component running on any computer when the laptop is connected to the computer. Over 3G/4G provider, the provider detects the SIM card number and automatically connects to a host PC that was preconfigured for that SIM card. The host PC can be hosted in a virtual environment using hypervisors.

On the operational side, when the laptop is turned on, it automatically connects to a host PC. The host PC sees the remote USH hub with multiple USB devices, such as a USB keyboard, USB mouse, and a USB graphics adapter, as its local resources. The host PC simply runs a program using those H/W components. The laptop receives all the graphics parts and interacts with the running program using keypad/mouse. The user feels all the data is being processed locally, however, the remote PC computing power is being leveraged here.

A modular computer is built with the CPU and USB controller that can be attached with the laptop as an attachable component, just like a user attaches a laptop battery. In this setup, the laptop can use the CPU power from the attached CPU module. The attached CPU module can be bundled with the battery, or even with the AC power adapter that the laptop uses. In that case, the new laptop can be run using the CPU module from the power adapter while charging the laptop's internal battery.

This setup will achieve few things by separating CPU and related components from the main body. The laptop can be much thinner and lighter because it removes the need for HDD, heavy battery, etc. It needs some slim battery to run just the LCD display and small circuit to connect to a host PC. However, its power is not limited by its local resources. If the user needs more computing power, it would simply connect to a more powerful host PC.

The separate CPU module and HDD includes a solid-state HDD, extra battery cell that allows it to make the design compact with a different shape. The user can carry that while on move so that even without power outlet, the module is still usable using the battery it includes while it connects to the laptop. The laptop screen can scale back to smaller display area to save even more power.

In a typical use case, the user will get a laptop with a monitor, keypad, and mouse with an embedded battery with wireless connectivity. It connects to a host computer where a host computer remotely attaches the laptop H/W and display application output. The user can use the full screen or scale back to smaller screen to save power. The user can also use the full power of the desktop from their laptop. While on the move, or when the remote host PC is not available, the laptop will connect to an attachable CPU module that would deliver computational power. In this case, the battery on the CPU module and laptop will be combined and shared to power each other. The CPU module can connect to power outlet to charge batteries attached to the CPU module or bare bone laptop. The laptop battery can be charged separately as well.

A regular laptop can contain some options so that it can expose itself to accommodate PEP, where it would expose its video/keypad/mouse to a remote PC as an H/W extension for a remote PC. A software component on the laptop will work as a broker that would simply get the packet on its own port and send over to a host PC and vice versa. Some hotkey or key combination might break the PEP mode. When a regular laptop enters into PEP mode, the user can fully access full desktop power with all its storage. This would work as a replacement for software-based remote protocol that needs a server side component. In PEP mode, on the client side, some software pieces present itself to a remote host PC as H/W devices.

We used USB port redirection to explain the setup here. It is possible to develop similar protocol and supported devices to support this unique CPU-less laptop that uses some host computer power at a remote location.

CPU-Less Tablet PC Using PEP

Tablet will assume the similar configuration of PEP-based laptop where it doesn't require a keyboard. Some identifier on tablet configuration will be transmitted to the host PC and it will detect that it is exposing its display to tablet devices. The host PC will overlay some floating keyboard that can be activated by a touch on the tablet screen. Once the keypad is activated, it can be moved around the screen and key input can be taken from there. The host PC might split the display area to make room for the keypad and mouse once activated. The touch screen will help to capture the user input and control the devices and screen. The table can have a small controller chip that would allow the user to configure the tablet to connect to a host PC, or it can be configured by attaching the tablet to a host PC before use. A USB programmable stick that has preprogrammed configuration data can be attached as well. Information such as what is the wireless configuration, encryption key, and password, so that later on, it can directly connect to Host PC without any user intervention.

CPU-Less Desktop

A CPU-less desktop is similar to CPU-less laptop setup where the USB hub and its circuit are packaged into a small circuit, embedded in a small device that exposes some ports where desktop components, such as the monitor, can be connected to a VGA port. An external keyboard and mouse can be connected to the USB port exposed by small devices. The small circuit can be embedded inside a monitor as well where the user can connect his mouse/keyboard to the monitor. Essentially, the monitor becomes an all-in-one computer and serves full desktop functionality without having any CPU/hard disk, and consuming a fraction of power a regular desktop consumes. The small circuit can be embedded in a DSL modem or Internet gateway devices the user uses at home, or even in an Internet router where the circuit connects to a back-end host PC using the link provided by the DSL modem or router. The circuit is programmed to connect to a particular host PC by connecting to its flush ram, using some external computing devices. An upgraded version of the devices can offer a small programmable component that allows the user/installer to configure it and its settings the way some advanced DSL routers provide. Those advance DSL routers provide an HTTP server where the user can connect to the device and configure all of its settings.

In one setup, port hubs such as USB hubs are connected in stages or in chain fashion, one connecting to the hub next to it. The host detects individual ports of a hub and devices connected to the hub and group them for a terminal station the hub represents. The next hub still constitutes a terminal station even though it is not connected to the host PC directly. One or more ports in a hub extend terminals where the host identifies the hub and devices connected to it, using some signature in the hub or devices connected to the hub. The host PC has multiple controllers where multiple hub chains are connected. The host reconstitutes a tree of hubs connected to multiple controllers and creates virtual hub layers that include all of the ports, except the port(s) that connect to another hub with a special signature. A hub without such signature becomes part of that hub it is connected to. A management component assigns a virtual hub to a virtual desktop running on host PC, or elsewhere.

Game Console Over PEP

Most living rooms nowadays have a game console such as Sony PlayStation or Microsoft X-Box. The console is very much a custom computer with an operating system, memory, HDD, and some custom application. The user interacts with the device using some joystick/wireless keyboard, and video is dumped to the TV console. Using PEP setup, the custom computer portion can move on the back side or at a remote location. A port will be delivered to the user's living room with some port HUB user can connect to their joystick/keyboard. The hub or adapter will expose a video port such as VGA or HDMI, or regular TV output. User input will be captured from the user's input devices and sent over to a remote host computer, where appropriate video will be processed and sent over to the video port. This setup allows the user to setup his connection to connect to PlayStation or X-Box based on their preferences and providers option. The user can also subscribe the service without even buying the H/W.

Misc. Services

Different services such as movie subscription and software subscription can be delivered through this setup using some provider. The user does not need to download everything at their endpoint; rather, they would need a connection to the provider base station or location where the user's home connection ends. This would also help scale the Internet better in the long run because Internet bandwidth will be exhausted due to media data. PEP can keep huge amount of data within the provider's network.

Integrated Desktop with Projector Over PEP

This setup includes a small projector with a base and head. The base includes an adapter that is used for port extension and connected to a host computer. The head section of the projector is connected to the base with a flexible body that can be bent in many ways to calibrate projection. The projector is connected to the display port of the adapter, which is embedded in the base. The base exposes ports for keyboard and mouse. When the projector devices are connected to the keypad and mouse, and connect to a remote host PC over cable or wireless, it turns into a desktop station. The remote host can run a VM to support the adapter. The host can connect to multiple projectors. Each adapter can connect to the next adapter using a pass through port exposed from the adapter.

Detailed Operational Steps

PEP extension simply extends some physical port of computing devices and extends that to a remote location by transmitting all the packets that would have been exchanged with the devices while it was physically connected to the computer. This removes the requirement of client server software where, on server side, information is encoded and, on client side, information is decoded. Since there is no client software, no CPU/HDD/extra memory is needed on one end to process information. Therefore, the extended port can be used as a terminal that can be very cheap, easy to manage, and power efficient as well.

At a remote location, a collection of computer servers are hosted in a powerful server H/W. Those servers run some hypervisor software, such as Microsoft Hyper-V, to provide virtualization support. Each server on top of hypervisor runs multiple virtual desktops or server operating systems. Each virtual desktop can be configured and delivered to end users.

Those physical servers are connected to a gateway that accepts incoming port requests from user's endpoint and redirects them to an appropriate physical server, to eventually route to a particular desktop VM.

User endpoint is a desktop port that the user can extend using a port hub. The desktop port can be connected to an adapter that exposes a display port/keyboard/mouse. The adapter has a reset or power on button. When the user powers on the adapter, it sends some signal to the gateway. The gateway determines some signature of the adapter or port to identify the user, then routes some signal to the appropriate server that eventually redirects to a VM that handles the signal. The VM detects that a video adapter, keypad, and mouse is connected to it; it doesn't matter where those devices are physically located. So effectively, when a user powers on the adapter in his possession, which is connected through the port, the user gets instant access to a VM and can interact with the VM without running any software client at the user's location.

Hypervisor software can launch the desired VM if needed to serve the user's request. A management software component configures the user's VM and sets up the environment in such a way so that user's physical adapter can connect to its computer when powered on, based on adapter signature. Additional credentials will be needed when the user logs onto their system. The adapter can accommodate some encryption to make sure no other devices can get on the wire and intercept transmission.

The generalized setup can be miniaturized by taking only one desktop computer as a server and VM host, and the adapter is connected to the desktop over USB cable. The desktop hosts multiple VMs and a software component connects each VM to a group of USB devices. This setup would allow a user to create multiple desktop VM instances accessible to multiple users in an independent fashion.

In this setup, some VMs can run multiple desktop sessions; in that case, a group of USB devices will be assigned to individual desktop sessions, allowing the user to use the setup in mix mode. This means the user can connect to an individual VM that provides bare metal H/W extension of the desktop and some users connect to the desktop session, which is shared by other users.

In this setup, the port extension hub contains a controller chip that adds additional signature representing station ID to the device descriptor while a device send it's device description to the host. The controller doesn't add the text when another similar port extension hub is connected. On server host or at gateway, a software component can group a set of devices connected to a hub just looking at the descriptor and filtering the signature before assigning those devices to a particular VM. The signature representing a terminal can be implemented in other way as well where end result is uniquely identifying

Software and Digital Content Subscription Framework

The following section describes a framework needed for mini-cloud system to enable subscription model for software and digital content so that mini-cloud users can subscribe infrastructure, software, and digital content. The framework has been described here in an independent way outside mini-cloud system. However, it would be obvious that many framework components describe below will be implemented in mini-cloud components. For example, a single subscription management component is used for infrastructure and software where they are just two types of resources. The framework client component will be part of mini-cloud integrator component installed on guest VM. Framework server can be a component of mini-cloud running in hypervisor. Framework application cache can be the extended cache of mini-cloud system.

Proposed Method for Software Subscription

The proposed framework will comprise of several components as follows:

1. Client framework component: This component will be installed on client system. This component will be configured to connect to a framework server component or another framework client component. During setup, or after setup, the user can select from a set of applications, environment, or some template subscription plan the framework support. A simple template might be a set of application HR department employee in a big organization might use. Or might be a set of teaching tools seventh grade students should use. Sometimes, the user or administrator can select a set of such template or application. Once configured, client framework component integrates the local environment in such way that user feels that all those applications are installed locally. To achieve such integration, client framework will intercept various event generated from user environment and create a virtual space similar to when all those apps are installed locally. Client framework component can intercept various system calls on local system targeted to file system, registry, shell environment, OS components, etc., and manipulate them to create full virtual environment. For example, when application access a file on local file system, the framework can intercept the call transparently, then copy such file from a remote server partially or fully and then provide data to the caller application. Application feels that they are getting data from local source. Before copying such file or providing, client framework module can validate, if user has enough licensing right to access such data, or if user need to pay before proceeding. The data can be related to application code or might be just a data file like a music or video content. Framework can validate if the data is coming from trusted source and data integrity is preserved. Frame work client module can run under the assumption that framework server might not be available all the time. In such case, framework client will cache most frequently used files (based on user needs and subscription plan or common user scenario) from the Framework server when the server is available and run with full or limited functionality when framework server is offline. This offline support can be backed by "framework plug-in application cache" as well. Framework client will also make sure that the user is running with most up-to-date files safe to run. This component will be heavily dependent on API redirection and manipulation to virtualize running environment.
2. Framework server component: Framework server will serve a set of framework clients. Framework server component will be hosting all the software or digital content or will work as a gateway to serve the entire request a framework client module can request. Framework server can work as a standalone component when configured properly, or can connect to other framework servers or global framework server for the information it needs to support the frame work client it serves. Some framework user like software vendor can add their own framework server to host the content they provide under some subscription plan. Framework server will host content package in special format that client framework can read on demand. Those content packages will be developed by a set of tools running against regular installation of application for a target platform watching how they interact with the system. Also, music and video content can be packaged together with application. EBook content can be packaged with its special reader to make sure user can read the book without needing any special reader that might not be available in users system.

3. Global framework server: Global framework server can work as a framework server or kind of framework server locator to find the correct framework server for software or digital content. All the components in the framework potentially can use private or public protocol to communicate with each other while contacting each other for information. Multiple framework servers each having some framework component can form a cloud of framework server's access able form different geographic location across the world.

4. Framework plug-in application cache: This component will comprise a process to create a container that contains data mostly needed by application or a set of application for most or all use case scenario. Such cache can be plugged-in with the framework client where client can run application without connecting to framework server with limited or no network connection. Such cache files or container can be put on any media like DVD/USB for roaming user or to provide snapshot of multiple application. This can be a new distributable medium of soft content. This cache can be put on much faster memory (RAM) where application can lunch very quickly as well saving slow access to hard disk or network.

5. Framework toolset or supporting process: There would be a set of supporting process or tool set to assist framework users or components. For example, some auto rating of software content will be used to build a knowledge-based shared resources. Framework can offer digital content (software or data/music file) from multiple sources and user can be confused which one to pick. When user start using those contents, some data can be collected automatically or based on some-input from the user. Those data can be used to rate applications. There will be a component so that content owner can publish their application in the framework. This toolset will include some special tools that can convert a regular application into special package suitable for publishing in the framework. Those tool set will watch how an application get installed on a system by recording which files it writes and what configuration it needs, this can be done using API interceptor.

6. Framework policy component: This will provide a set of process to allow framework users to control digital content uses and management. For example, content owner can set policy associated with their software or digital content defining that those content are valid for 30 days. The user must update them after 30 days. Content owner might set policy that only user at particular framework subscription model can use the content or user must pay one-time fee. End user can set some policy that content foot print need to be removed within after 30 days of uses or when license expires. A corporate might set policy that inside their corporate environment only 20 concurrent uses of particular content should be allowed because of its license constraints. Framework subscription plan simply might be a set of policy.

7. Framework naming resolution services: Digital content can be identified by some content ID like GUID or user friendly name "OpenOffice.Foo.Com" framework user might receive those content titles from various source. However, they need to know which framework server host those contents because there are many framework servers. This service would help to resolve that. Content provider can host their content on one of the framework server that can be added in the framework which eventually updates the some central table containing a list of servers hosting contents.

Detailed Description of Software Subscription Framework

Under this framework, a client will have a proxy installation of all the software components they subscribe. When they try to use the application, a client module will be invoked and connect to a remote server and download necessary program modules and start executing application. The client module might keep some copy of files in the local cache to optimize future launching the application. The client module might start some background work to download more files and put those files into local cache user might need over time. As user starts using different options or feature in the software components, the client module might start taking some files from the local cash or connect to the local or remote server and get the desired files. The key difference between this approach and the conventional approach is that the proposed one only download files on demand basis and don't require installation of that components including all unnecessary files user don't need in their first try. Also, user can create a application cache or get application cache from other source where user can put the cache file on USB or moveable device that can be used when he is traveling or don't have network connection. Software vendors can put snapshot of 100 of software titles on single DVD because their footprint becomes much shorter.

Installation on demand can make most application subscription based. The core concept is simple that can be achieved in numerous ways. Here are the two basic goals that need to be met:

a) On demand, installation will allow users to run application without any requirement of explicit installation at the beginning. Framework client component will download some proxy files that can have similar icon (original application has) and can integration itself with the client environment like adding a shortcut on desktop or start menu. The user gets feelings that the application is installed locally. Other applications also think the component is properly installed. For example, the user might receive an e-mail attachment with word doc. The client might not have the word doc, however, he might have the proxy word doc. When the user click on the attachment, that invoke the framework installer to download the word application and lunch it with the attachment.

b) To make the application subscription based, somehow a component should transparently manage the lifetime of those components that is guided by the policy users and vendors agreed upon. Framework can enforce such policy.

The framework proposed here achieves those goals and extend the usability that works in the real world. Those who are skilled in the art understand and appreciate that the framework can be implemented in any fashion where those goals described earlier need to be achieved.

Framework client component can be embedded inside an application or proxy application as well. Proxy application can be a text file containing some information enough for a framework client component to download the application from the framework server. Proxy application can be an executable image as well that can run on its own to serve the same affect. Embedded framework with proxy application can be run on any client machine without any previous installation of framework component.

Policies Module

This will dictate how the framework should work, how the client modules should work, how the server modules should work, how different managed software components should be transferred from server to the client side, how long a client should be able to use the components, how the licensing policies should work, etc. Example policies might be as follows but not limited to them.

a. A component should be usable on the client side for only a certain period of time.
b. The user should be able to use the subscribed application from multiple places but exclusively, that is, this will help user to use application from one machine in home and one machine from office but not simultaneously.
c. Group policies: Multiple users might share the same policies.
d. Client should be able to run application offline up to certain time.
e. There might be varieties of subscription-based policies defined by the vendor that fit into their business mode.
f. The framework is a generic framework, and any vendor can host the server modules for their own application to make them subscription based.
g. Using the client module, the user should be able to communicate with any of the server module as long as the client knows the location.
h. There might be a central server that can maintain all the location of the server that host subscription-based components.
i. The user should be able to subscribe the component for lifetime and go for a complete installation, as it would do in today's scenario. However, they can still enjoy all the benefits like hot installation and start using the application when the installation of the application is still going on.
j. A third party can develop a set of policy to offer software services to consumers by hosting application developed by others.

Those who are skilled in the art understand and appreciate that a policy modules and the set of rules can be deduced and implemented in any fashion where some information is transmitting from a producer to consumer and the producer wants to dictate how the consumer should use the information.

Updating Products

Transparent update of the component is a key advantage of this setup or framework. Server module keeps the original files for a particular application. The server might keep different sets of files for an application depending on the version of the product. For example, for Microsoft Office 97 and Office 2000, there might be two sets of files. When user on the client side launches Microsoft Office, the client module might contact the server to validate its own version of the cache files. For example, it was running Office97. Depending on the subscription policy, the server might send the files from the set of Office2000 or ask the client to go ahead with its local version. In this approach, if subscription policy permits, the client need not be bothered with the upgradation. It happens automatically and transparently unless dictated by the client/server policy. Those who are skilled in the art understand and appreciate that transparent update can be implemented in any fashion where some information is transmitting from a producer to consumer and the producer wants to dictate how the consumer should use the information and which version of information the consumer should get.

Proxy Installer

In the proposed framework, the component can be run even without installing them on the system. This makes the whole process easier but it might require some minimal starting point the user can start from. Also, other components already installed on the system need to be aware of the component managed by the framework for better app-interoperability. To overcome this particular problem, there will be a proxy installer that would update configuration information in such a way that as if a real installer updated that information. Proxy installer might work transparently the first time users use the component or subscribe some components. This process would be very fast because it only updates configuration and creates some starting points (e.g., icon or menu item in Microsoft Windows) user can start from. Proxy installer can create empty directory structure or copy some stub files for its own uses. Proxy installer might use configuration files per component basis. Those configuration files will contain information to update configuration database. Another part of the proxy installer might create those configuration files from the real installer for a component. For example, a proxy installer on Windows2000 can intercept all the registry update for Microsoft Office2000 installation on a machine for full installation and redirect those parameters in separate files. That can also intercept and redirect desktop/menu bar update information. Now, the proxy installer can replay those call with some modification and changes on another client machines with proper user context. This way, the client machine will be configured as if real Microsoft Office installation was done on this machine. Some information in the registry needs to be modified before it can update on the client machine. As there is no file installed in the machine (except some optional stub or configuration files), therefore data that point to the file might go through some handler that can interact with client module that can eventually get that file from the server. The proxy might copy minimal file in the local system in some special cases. Those who are skilled in the art understand and appreciate that proxy installer can be implemented in any fashion where it needs to fake the system, that a real installation took place, and activation to any installed sub-component of files need to go through another process that can supply that subcomponent or files.

Two-Level Virtualization

Using most of the components described earlier, a framework can virtualize the environment for most of the application. Virtualization means that users feel that the application is fully installed on his system which is not, and the application also runs with full feature even though many features doesn't exist on the user's system. Virtualization will create a separate state of application running environment for the application managed under the framework. However, those virtualizations might forbid some application from running normally. Some application might have too much dependency on system components like drivers. Such multi-tier virtualization will be used where portion of framework managed application will be visible to the native system. Proxy application or installer might split the application configuration into two pieces: a) suitable for framework and b) must be run outside virtualized space to interact with the system more closely. Some hybrid form can be used as well where some component work as a collaborator between virtualized and native system.

Implementation Details of Software Subscription Framework

Assume that an exemplary framework to support one tax preparation application say MyTax. The client has the client module for the proposed framework installed on their system. Client also knows that www.Mytax.com is the service provider for that application. Also, there might be other third-party provider for that application. Now, the client goes to that location and browse for the page that contains information about MyTax application. The client can choose a lot the subscription policy that fit with his requirements. When they subscribe the application, a process on the client machine will be invoked that invoke proxy installer to install a proxy version of MyTax application. The proxy installer will be responsible to create necessary starting points for the users (e.g., icon or shortcuts, menu items). The proxy installer might talk to the server with some credentials user supplied to get some configuration. Then the user should be able to start from the starting point whenever needed as if the product has already installed into the system. The client policy might also allow downloading all the required files at a later time. When users run the application, the client module can download any additional files. Anytime, the user might force the client to refresh its cache with the most recent update or trash cache explicitly. When the user is done with the application, it can forget about the application. The client module then can discard any cache files applying some policy that is consistent with the vendor and user. A vendor can set the policy like after April 15, the files expires and client module can clean up the client machine if required like the temporary cache file while browsing the Internet. Next year, when the user again tries to use the application, he or she can pay subscription again and same thing might work.

The framework might offer numerous options, which could be available only in true client-server environment. The MyTax wasn't written as a client/server application. However, the vendor can use a set of tools to do some statistical analysis, the way the user use the application and provide some information to the client so that the client can optimize download time. If client never uses a particular tax form, what's the point to install that on the system of the client?. Also, if the client never uses tutorial program, relevant data/files associated to the tutorial program are useless to the user. And it's not possible for the developer to make every single file or a set of files as installable features. The framework provides a transparent client-server flavor without requiring developer to rewrite their applications. Also the client modules/proxy installer/customer loader enable user to run application even though some files/data are missing on local storages.

A lot of flavor can be added in the framework. For example, a co-coordinator might be in-between the user and vendor that can provide security or play role in secured money transaction or provide insurance. A license manager or policy manager can dictate the licensing issue for all the managed application user uses or some other services can be added in the framework.

Deployment of this Software Subscription Framework

This framework can benefit normal consumers and developer in many ways. User can use software components as need basis and without any headache to manage those components themselves. Software vendors can cut down a lot of distribution cost and sell the product at a competitive price. This can also help them to release any fixes or product updates quickly.

The framework can be integrated with the popular Internet browser, or as a stand-alone application that assists normal consumers to get all the benefits this framework offers. ISP like AOL MSN or any third party can launch server modules that host a lot of application and their user can use some of them paying some subscription fee. The service provider can get volume discount from software vendors and offer to their own user at lower prices. Under this framework, the user need not be worried about buying a product and keeping them forever, rather they just need to remember their provider name. From any machine on this globe that has this framework installed, the user can use their popular application, which they subscribe from the provider as long as the subscription policy permits.

Though the framework has been targeted for the application already deployed in the real world, it would be preferable to have some application that would be aware of the existence of the framework. That way, the application itself can talk to remote server using the functionality provided under the framework. The OS itself can use this framework to update any hot fixes of install/uninstall any system components.

This framework can also benefit consumers to access their own popular application from any client across the network. The consumer can run a server module that can host all the applications he uses. From any compatible client that supports the framework, he can temporarily install his own application with minimal possible configurations. This might allow users across network to share their popular applications. The user can use the application without complete installation and a background process might download additional information offline.

Another Embodiment of Software Subscription Framework

In another embodiment, the framework can deploy some application streaming technology that allows application to stream an application from server to client on demand basis. Those streaming technology can replace some of framework component abstracting portion of framework client module, framework server module, and framework toolset component. Some application virtualization technology can be used as well to replace some framework components. In dynamic world, various component method or process can be used to deploy to replace portion of the framework to exercise the full benefit of the proposed framework, or the framework itself can be enhanced. It's also obvious that the framework can be used in various forms to deploy or deliver application, license management (using policy), automatic servicing or updating (by enforcing some policy, or integrity checking), content publishing (combining content with application), and life cycle management of content. Framework can be extended by using framework naming service and by adding new framework servers.

In short, streaming technology will consist of three components: a) sequencer or profiler to profile application for a target platform that write the whole software into a package, b) server component publish those package and deliver to client upon request, and c) client component that can download those packages from server on the fly and as need basis.

In another different embodiment, a bare bone computer or computing device might contain minimal component with framework client module good enough to connect to framework server or use plug-in cache files. Using those combinations, H/W vendors can ship those device as-is. The user can simply attach those devices to network connected to framework server. The framework client then downloads required component (may be OS) to build the complete environment including OS. That might help to virtualize application as well as OS itself.

In another different embodiment, framework can be deployed to manage license in a corporation. Different vendor might offer different licensing model and they might offer different licensing server, once the number of software vendor grows the number of such servers grows creating lots of headache for corporate customers. The proposed framework can abstract those different vendors' license servers and consolidate all into one offering easy maintenance how many of copies should be used in the network at any given time. Also, framework infrastructure might host different vendor supplied license servers. Corporate can host a single framework server component that can work as a proxy for all vendor supplied license server if needed to activate content used in the corporate network. This will open up door for regular user to take advantage of volume license model where framework can buy volume license directly from vendor and distribute and manage those license to end user with great savings in the form of subscription. Typically, end user can't get those savings because they don't have the infrastructure to support license servers and can't buy license in bulk.

In another different embodiment, a corporation can deploy part of the framework with few framework servers inside its private network. The corporate's own client machine will have a private version of the framework component. The framework server will connect to other servers outside its private network to collect data for published content the corporate intend to subscribe or purchase; corporate can also develop its own content for its internal uses and not exposed to outside users. Client computers always talk to the internal framework servers for any sort of services. In this case, a corporate can deploy the service for its own users without developing any content but using content from infrastructure framework.

Though the discussion of the software subscription framework was limited to software and digital contents, it is obvious that other content such as platform can be offered as well. Platform where the user chooses if he needs a database server with SQL on it, or a simple Windows XP system, can be provided as part of subscription through mini-cloud system or through a VNC-like client that can connect user's system to a remote VM skipping mini-cloud system. In both cases, the subscription can be managed by the proposed software subscription framework. Also, software publishers might publish their software in the form of virtual appliances where publishers install the software on a guest operating system and simply ship the VM image. A user can install the VM on a mini-cloud host and get access the software already installed in the VM. Those are just few examples and many combinations are possible.

Embodiment A: Mini-Cloud as Smart Modem

SBC would contain memory and some storage that can be used to run a program. The SBC will allow remote access to install and manage all its software pieces. SBC will support a video port and keyboard and mouse port. Users can connect to their existing monitor and use regular keyboard and mouse to access the modem box. The video, keyboard, and mouse port can be exposed through a wireless port where users can connect to the device using wireless mouse and keyboard or use a monitor that can wirelessly connect the device.

The modem box will be powered by regular power. It can host some backup battery. The box will have port(s) to phone line, fiber-optic line, or cable line or even a simple Ethernet port that users typically use to connect to access internet. The proposed DSL router will have a wireless chip to connect to wireless provider such as WiMax or 3G wireless service provider in case backup internet connection is needed.

SBC contains an embedded operating system. The embedded operating system contains sufficient software element that can manage all the components described here. Some component of the operating system can be managed and serviced remotely. When the modem box is powered on, the embedded OS runs a preinstalled client access application that works as a remote access application such as RDP (remote desktop protocol from Microsoft)-like client. The application is configured in such a way so that it initialize all the connection needed to connect to a back-end services hosted or managed by the Internet service provider or another third party. The access application would take credentials either from the users or from the devices itself to authenticate and initialize a connection and connect to a remote desktop. So effectively, when a user powers on the modem box, it get a visual representation of a remote desktop. Client access application takes input from keyboard and mouse, sends it over to the remote desktop, and transfers the graphics from remote desktop to the user's monitor. Everything happens transparently and the user feels that the modem box has become the desktop. The gateway can have local storage and other ports such as USB. Client access application will integrate those ports with remote desktop using some protocol so that the application running on remote desktop can access those local resources.

The router contains a circuit that generates some signature ID that changes over time. When the device authenticates to connect to remote desktop, it sends its current signature. An authentication service checks those ID to make sure it was generated by the specific devices. The user can turn off the device level authentication choosing some account settings.

If for any reason the Modem box can't connect to the Internet using its regular line, it will try to use its backup connection using its wireless connection and deliver the remote desktop to user. All the client access software, modem functionality, and embedded OS can be integrated into a single electronic circuit that doesn't need any software.

Once the user is connected to his desktop, the user can configure his system with a configuration portal component and reboot the system. The remote desktop is hosted in virtual environment typically backed by hypervisor such as ESX from VMware or hyper-V from Microsoft. In virtual environment, users' desktop can be hosted on different kind of servers backed by different kind of processors based on user needs. And the desktop is migrated to different servers without requiring shutting down the system with live migration technology. So effectively, a user can configure his desktop on the fly. What kind of configuration a user likes for his desktop and those configurations can be delivered at run time or during next reboot. This way, the user can subscribe higher configuration at a bit higher cost when he or she needs it and subscribes to lower configuration at lower cost when user doesn't need costly configuration. When a user subscribes an Internet plan, it comes with a basic desktop configuration that is part of users account settings and delivered using the new access gateway or the new DSL router.

When user powers on or boots up the modem box, it talks to a back-end broker services that authenticate users and take settings from the user account to create initial users remote desktop. From the desktop, the user then can change his configuration using some tool that sync up those settings with user account so that the next time the user connects to remote desktop, same settings can be used. So effectively, user's settings become part of computer settings as well as user's account settings, which is part of subscription plan.

Sometimes, the user might need a desktop just for web browsing, in that case, the user doesn't need a dedicated desktop, back-end broker service can put multiple users on a sever that can support multiple desktop sessions simultaneously. That kind of flexibility will translate into lower cost to end users. When the user needs a system say 8 CPU and 32 GB memory for two days, user can simply subscribe to a higher plan, and when the user reboots, back-end broker service will get user settings and figure out that the user needs a powerful desktop, so the broker service pick up a powerful desktop and apply the settings of the user (applications and configurations) on it and deliver the desktop to the end user. When the end user connects to his remote desktop, he simply finds a powerful desktop with his familiar environment.

The user can subscribe to multiple remote desktop services and access them the way they like.

Multiple value-added services is added on the back end. From subscription or configuration tool, the user can choose option to back up their critical information on a given schedule or on regular basis. ISP buy software from third party on a basis of device license or applicable for virtual environment and then give access to its user. The user can choose software application they need for use for certain period of time. When subscription time expires, application is removed from user's remote environment completely. To manage those subscription-based application deployments, a profiler component is used. Profiler component prepares a given application with its own entire configuration so that it can be streamed to user's remote desktop. Application package is given an ID number that is stored with user's account settings or profile. The subscription time is also attached to used profile.

When a user connect to remote desktop, user's profile or account settings has enough information what kind of resources user will need and what application user want to use. DSL router will be the primary way user would access his remote desktop. However, the user can access to his desktop from another location that doesn't have the proposed DSL router. In that case, the user would need another computer that can download and execute a remote access client. This access client will be a similar one to that embedded in DSL router with added functionality for authentication. While connecting from DSL, ISP can easily verify the physical signature of the device such as MAC address or some special ID ISP embeds in the device. While connecting from another computer, the user needs to authenticate by providing extra password or reusing user's remote desktop password based on the authentication requirement set by ISP or users.

The user can connect their remote desktop from a mobile phone. In this particular embodiment, the mobile phone can work like a proxy DSL router. Mobile phone resource can be used to create an Internet connection to ISP. Mobile device ID can be used to authenticate that the mobile device can connect. Before using the mobile phone, the user can change his or her account setting to allow his or her mobile phone to connect his or her desktop. The mobile phone will run similar application the DSL router would run. This application can adjust the resolution so that the user can freely view his or her desktop (which often has a high resolution) on mobile screen. Sometimes, mobile phone can have embedded projector or it can project through its port to a larger screen, in that case, the application can use the secondary larger screen for the desktop display. The mobile application will virtualize mobile resources so that mobile screen and secondary screen can operate independently. The application can create second virtual graphics display to deal with secondary display while using the primary display to project keyboard and mouse functionality. The second virtual display would allow displaying on the mobile screen and on the secondary display independently.

Embodiment B: Mini-Cloud-Friendly New Devices and Steps

The following sections outline few devices that can work independently or in conjunction of a mini-cloud systems along with some operation that are critical to use the system in production environment.

Kids PC

A sample kid's toy is developed as a terminal that can connect to a mini-cloud system. The toy connects to a host computer over wireless connection or using some port like USB cable. Upon connection, the host computer or mini-cloud detects that a kids device is about to connect. Some policy kicks in that makes sure the device can easily connect to a guest VM without complicated authentication. Such policy can enforce simplified configuration possibly compromising security based on proximity. For example, we can't expect a kid to remember password complexity. Rather, the host can deliver a virtual computing environment with great flexibility.

Power Reset Steps for Terminal

This is done in conjunction with a terminal or zero clients connecting to guest OS environment running on a mini-cloud system. Zero clients can connect to the guest over an IP network. Some control of the zero clients can be connected to a second controller that can communicate with the hypervisor. Zero client devices are equipped with a power down or reset button. Those controls are communicated to the second controller and the controller then communicates them to the hypervisor for proper action. Based on the control-type hypervisor or the OS, the host can reboot or power down the system. Another alternative approach is zero clients that can issue some broadcast message to control the guest. The controller can interpret the broadcast message and then take appropriate actions.

Collaboration and Video Conferencing Using Terminals

A terminal equipped with video camera is used to capture presenter image. A step collects all captured video data from users along with users screen display data. Another step would combine all those data and would send back to users so that each user can see other users based on some selection. The challenge would be to allocate screen region for individual audience and manage those remote slice with a central interfaces. Audio part can be mixed easily with some audio engine. The video part needs to be processed in real time and deliver it as video.

On a slow network, if we can detect prominent component of face, we could simply transmit them with some synthesis.

Way to Access VM from Terminal

Typically, to connect a VM using a terminal, the VM runs some software that emulates some devices that get redirected to terminal. For example, a video driver is loaded in the VM that works as a virtual driver that receives all the data that need to be displayed, then it encodes those data as appropriate and sends it over to terminal. So essentially, the VM runs a software stack to support terminals. It's possible to build the stack outside VM and inside the hypervisor host. Hypervisor will show the devices as physically connected devices to the VM. The VM still might need some software components that work better with those virtual devices.

Terminal Authentication Method

Terminal and mini-cloud system contains some H/W-embedded serial number and signature that is registered with a particular user's subscription plan. Admin at ISP should be able to identify mini-cloud and its connected terminals uniquely. Some public key/private key combinations and strong encryption are used to identify them. Users or admin should be able to assign a terminal to a particular VM or change settings of a VM access right so that terminal can choose which one it wants to connect. A GPS receiver module is used in those components to register a device at particular locations.

Embodiment C: Mini-Cloud and Sectional Computer

Nowadays, many of the people uses multiple computing devices that include a) desktop computer, b) laptop or netbook, and c) mobile phone or smart phone. There is always an attempt to break the middle ground between two gaps. For example, iPad like tablet PC sits between laptop and mobile phone. Price of devices is going down, and most of the cases, a user tries to keep a set of devices for his personal uses. Even in a family, husband and wife use their own phones. With multiple devices, data are scattered all over the places, management is a bit difficult, and a manual synchronization that synchronizes data across devices is too technical for average to understand and troubleshoot. It would have been nice to have a device that could have been framed in many ways using different sections or parts to provide different form factors user like to use in various settings.

Sectional Computers Setup and Operations

1. A smart phone is designed with its own CPU battery with a screen size 3.5 and depth with ⅜ inch. The user can use the device for regular carry on device. The user can run some applications that fit mobile needs. The smart phone is framed in such a way so that it can export some connections to housing when it is slide into another frame of larger devices. Those connections allow those two devices to communicate.

2. A tablet is designed that only provides larger screen and a frame. Screen size can be say 5-13 inch diagonal. The frame contains a housing where the smart phone can be slide in to fit into the housing. The housing is made in such a way when a smart phone gets into the frame it's not highly visible and doesn't impact the usability of the tablet. Some buttons and external ports on tablet and smart phone are connected through some ports so that buttons and ports on the inserted smart phone can be accessed using tablet. Tablet can use the battery of a smart phone or its own power source or combine them both to provide longer battery life. Tablet can have different set of ports than the phone; a small component called connection broker work as a mediator to translate contacts between tablet and phone in such case. While being used in such configuration, some ports or components of phone are disconnected from battery. For example, while using the tablet screen, phone screen is not powered on to save battery. The connection broker is extended to manage and manipulate all those changes. And the phone is designed to support that mechanism so that phone can be controlled by the connection broker and for the said uses.

3. A desktop setup is very much with a monitor with all typical ports such as audio, mouse, and keyboard attached to it or through some additional housing kind of all in one computer. This particular setup is built as slim as without the CPU/motherboard/HDD units. So essentially, it is a bit more than a monitor with a housing where the smart phone can be slide in. Smart phone is being placed on a docking station as well. Basically, smart phone can be charged when the computer is in use. A connection broker attaches desktop ports to smart phone. The functionality would be similar to tablet except some desktop-specific scenario such as desktop keyboard might have more keys than phone and tablet.

4. When smart phone is slide into a larger device, the device is controlled using the buttons from the larger devices, or using some remote accessories, the smart phone can communicate directly or through larger devices. The smart phone is configured to what kind of display or accessories it needs to use when it detects or is being hosted inside larger devices. The configurations also set up how to use and optimize power connections. H/W part is designed to support those configurations.

5. So effectively, using the mobile phone user can use multiple form factor devices to save significant amount of resources. For example, users need not to buy expensive H/W rather than just the display with compatible framing.

6. With this model, the only part that needs to be extended is computing power. Since the computing power is limited by the processing unit on mobile phone, it needs to be extended. The mobile phone unit includes a software and H/W components that can communicate to a remote host computing devices where it can run application and deliver the output in similar fashion of remote desktop provided by Microsoft as an example. The remote host can simulate the environment and run application and deliver it to user based on the environment user is using. For example, when using a tablet, it can run an environment on remote host suitable for tablet; when user uses desktop monitor, it can run separate environment on remote host. Smart phone here in this setup simply work as a medium to communicate with the remote host, deliver the graphics to user, and send back inputs from users to the remote host. Smart phone also does some port or device redirection where remote host see some of the local devices at user end and them as if they were connected locally.

7. In that setup, a mobile phone can deliver limited computing power to desktop environment or on tablet environment when offline and can deliver very high computing power using a remote host. The remote host can be a stand-alone computer or a guest OS environment running on a hypervisor.

8. In this setup, when offline, the desktop will use very much the same computing environment mobile phones can support. For example, in offline case, mobile phones might not support Windows 7 operating environment that can be accessed with desktop or tablet setup. However, while using a back-end computing host, it can deliver whatever environment back end can supports that would include any typical environment including Windows.

9. Smart phone is replaced with a zero client: In another embodiment, the mobile phone is replaced with a device containing SoC called zero client that can provide computing power to desktop/tablet while offline. And connect to back-end OS system where the device simply works as a connection broker to deliver remote computing environment locally. The device can be a removable sectional part of the desktop or can be attached to the desktop.

10. In another embodiment, a home-based system with a hypervisor can host multiple execution environments, a zero client or smart phone simply connects to one of those execution environments to deliver the execution environment to a preferred form factor. Zero client or phone easily connects to the home base hypervisor system over Wi-Fi like wireless connection.

11. Game console: The home-based system can host a computing environment to support game console such as X-Box or Sony PS/2. Smart phones or zero client devices can connect the console to TV or larger form factor to deliver game or movie. Game application or movie will run inside the guest environment on the back end and the display is delivered on TV or user console using a connection setup by the smart or zero clients. The device is also responsible for attaching other input devices to the back-end system so that user can interact with the game as if user is running those game or movie on a local console.

12. Home-based system can host an environment that can deliver some home appliances like photo frame applications. A zero client embedded in the photo frame would connect the photo frame display to the back-end environment.

13. The home-based system mentioned earlier can be hosted outside home, and inside another provider infrastructure. The connection is established over internet connection that works on broader range such as WiMax or FiOS (fiber-optic link).

14. Power button implementation: In that setup, a button or port on one device such as desktop is connected to back-end system directly or indirectly and implemented in button or port-specific fashion. For example, a power reset button accessed from desktop, when pressed will send an electronic signal to smart phone that tells smart phone as if power button on the smart phone has been pressed. When the desktop is connected to a back-end guest OS that is hosted by hyper visor and a broker such as zero client or smart phone establish the connection the power reset is implemented in a different way. When the power button on desktop is pressed, connection broker identify that even then it send a signal to the hypervisor that a power reset button has been pressed. Then the hypervisor would take action to power down or reset the guest OS. Since Guest OS is running in virtual environment, it didn't have physical power button. However, all the functionality of the power button is implemented in such a way user feel that the power button is connected to the guest OS.

15. Power/battery: Zero clients that can be an individual electronic devices or a smart phone can work as a zero client. It can have its own battery source for its own power suitable for connecting over wireless; it can connect to a port such as USB or Ethernet that can deliver a network connection and power as well. Power rating for zero clients is small enough to enable it. Zero clients can store some power to drive some essential elements of a larger computer including display and a touch pad that can work as input devices.

16. Video conferencing: The sectional devices in some combinations can help to establish video conference. Typically, video conferencing takes lot of bandwidth. Camera can be exposed from multiple sections and one will be active based on how user uses the configuration depending on smart phone, tablet, or desktop environment. Camera can capture video frame send to a different user along with audio. An improvement is done here where a software component identifies prominent section of the video frame captured by the capture device, then based on the network connection it send area around the prominent section more often than the whole frame. For example, eye and lips might be considered as prominent sections. When not enough bandwidth is available to transmit whole body frame, sending some prominent sections will keep communication live and interactive.

17. Multi-purpose tablet: There are some devices that combine two separate computers having its own hardware component into a bigger computer. For example, some device combines netbook and tablet together.

Embodiment D: Example Steps Users Takes to Use Infrastructure and Software as a Service A home uses takes a step to call an ISP to install Internet connection for his home. User either buys a smart modem or leases a smart modem from ISP. That smart modem works as a mini-cloud system. The user can choose different models of mini-clouds that run VM locally or connect to a VM that runs on ISP infrastructure. Once ISP installs Internet connection for the users, users gets Internet connection through the modem as usual with users existing computers. The modem can also work as an Ethernet router or wireless router. In addition, the modem exports some ports user can connect his monitor and keyboard to get access to an additional computer, the user can use that additional computer exposed through modem as primary or secondary computers. Now, user can buy additional terminal that is supported by mini-cloud system bundled with the smart modem. User can use those additional terminals as thin laptop, VDR box, game terminal, or additional PC. Those terminal exports needed ports to support a computing environment.

The modem designates one set of computer ports either through a terminal or attached port for administrative works. Once the system is up and running, other terminal can access management interfaces for mini-cloud system. The management interfaces can a simple web portal where users can registers terminal, create a computing environment for a terminal, create computing environment in the cloud backed by ISP, etc.

The administrative work can be setup and done by technical personal from ISP as well who can access mini-clouds system in users premise or in ISP data centers to create needed infrastructure a user needs and willing to pay.

If user has multiple computing devices on premise, the user can choose to create a private network all his end points are connected to backed by a firewall. All those managements can be done by users or admin from ISP.

Here, we took ISP as an example body, in reality, any one can play ISP role. For example, large corporation can have their own data center with mini-cloud systems. Individual branch office becomes their clients. Smart modem for those branch offices are replaced by larger model of mini-cloud systems.

Once the infrastructures are up and running, users can connect their thin terminal to a VM running on local mini-cloud system or in the cloud. Once users interact with the VM, based on users' credentials, users can further access their subscription plan and adjust their plan, increase resources, decrease resources, etc. For example, users might need to use a two-processor system for a video editing application for two weeks with large memory. Users simply take a step to add that requirement in their subscription plan and attach those resources in some VM they own or create a new VM. Users can reboot their system by pressing a power reset or software reset, the next time users connect to the VM, it runs with two-processor systems. If those resources are not available locally, users are given options if he wants to subscribe from actual cloud. Once set, two weeks period expire, those resources are automatically removed from user subscription plan unless user want to continue to use them and pay for it.

Once users get access to subscription based infrastructure, the next natural issues come in what software application user can run on those infrastructures. Users can add software application as resources to their subscription plan. Users can also choose how many licenses they want and which VM should have access to it. Once users choose those resources using a subscription manager or some management console, an auto installer installs those applications to users' systems without any intervention from users. So when users log-on, they simply get access to those applications. The automatic installation can be done in many ways, such as using application streaming or writing a separate installation package that works better in mini-cloud environment.

Although the mini-cloud system to make infrastructure, software components, and digital content as a subscription-based service has been described in language specific to structural features and/or methodological steps, it is to be understood that the actual implementation defined outlined earlier is not necessarily limited to the specific features or steps described. Rather, the specific features and steps are disclosed as preferred forms of implementing the claimed mini-cloud system to support subscription-based computing model. It is also worth noting that some components and steps outlined here can be used outside mini-cloud systems.

We claim:

1. A mini-cloud system for enabling user subscription in a residential environment to a computing infrastructure, software, and digital content provided by one or more cloud service provider, comprising:
   a mini-cloud host device that connects remotely to a backend cloud supported by the cloud service provider, the mini-cloud host device comprising a hypervisor for hosting one or more virtual machine; at least one emulator running in said virtual machine;
   one or more thin terminal for connecting to the virtual machine in the mini-cloud host device via a port extension protocol, wherein the port extension protocol uses a two tier solution comprising:
      a first tier where the thin terminal connects locally to the mini- cloud host device over a fast network link or directly via a cable; and
      a second tier where the thin terminal connects remotely to the backend cloud through the mini-cloud system over a slower network link;
   a subscription system that allows a user to subscribe to one or more content provided by the cloud service provider and access the content through the virtual machine supported by the mini-cloud host device, wherein a user subscription process comprises:
      a step for the user to sign on to a subscription plan provided by the cloud service provider,
      a step for the cloud service provider to create one or more virtual machine and provision the virtual machine on the mini-cloud host device,
      a step for a framework server component of the cloud service provider to configure the mini-cloud host device according to the provisioned virtual machine,
      a step for the user to connect the thin terminal to the provisioned virtual machine running on the mini-cloud host device via the port extension protocol.

2. The mini-cloud system as recited in claim 1, wherein said emulator runs program instruction not native to mini-cloud host hardware.

3. The mini-cloud system as recited in claim 1, wherein said emulator runs device specific environment.

4. The mini-cloud system as recited in claim 1, wherein the mini-cloud host device includes an extension card to support functionality of a device from a group comprising modem, Internet router, DVD player, game console, internet television and telephone system.

5. The mini-cloud system as recited in claim 1, wherein the mini-cloud host device includes a router component that serves as a local networking access point and connects the mini-cloud host device to an external network.

6. The mini-cloud system as recited in claim 1, wherein the thin terminal comprises a port to connect to an external display to display contents of the virtual machine.

7. The mini-cloud system as recited in claim 1, wherein the thin terminal comprises a management interfaces on said mini-cloud host to manage said thin terminal.

8. The management interfaces as recited in claim 7 is a web portal allowing user to create computing environment in the cloud.

9. The mini-cloud system as recited in claim 1, wherein the thin terminal connects to the mini-cloud host device over a wireless connection.

10. The mini-cloud system as recited in claim 1, wherein the thin terminal comprises a physical power reset button that resets the virtual machine that is in connection with the thin terminal.

11. The mini-cloud system as recited in claim 1, wherein the thin terminal contains one or more ports from a group comprising keyboard port, mouse port, video port, audio port, microphone port, network connection port, universal television remote port, and USB port.

12. The mini-cloud system as recited in claim 1, wherein the subscription system comprises:
   a digital content subscription system that allows the user to subscribe to a content package from a group comprising applications, digital content and virtual machine,
   a deployment component that deploys the subscribed content package on the mini-cloud host device,
   a life cycle manager to update the deployed content package and remove the content package when subscription expires.

13. The mini-cloud system as recited in claim 1, wherein the virtual machine supports a remote protocol for the thin terminal to connect to the virtual from a remote location.

14. The mini-cloud system as recited in claim 1, wherein the subscription system includes a content provider component that creates one or more virtual machine package that the user can subscribe to and run on the mini-cloud host device.

15. The mini-cloud system as recited in claim 1, wherein the port extension protocol connects over a slower link to exchange information with the cloud service provider.

16. The mini-cloud system as recited in claim 1, wherein the port extension protocol is implemented by configuring a standard remote protocol such as VNC or RDP to work in fast connection while connecting the thin terminal to the mini-cloud host device over a fast network link or a cable.

17. A method to build mini-cloud system for enabling user subscription in a residential environment to a computing infrastructure, software, and digital content provided by one or more cloud service provider, comprising:
- preparing a mini-cloud host device that connects remotely to a backend cloud supported by the cloud service provider, the mini-cloud host device comprising a hypervisor for hosting one or more virtual machine;
- adding management interfaces that allow one or more thin terminal for connecting to the virtual machine in the mini-cloud host device via a port extension protocol, wherein the port extension protocol uses a two tier solution comprising:
  - a first tier where the thin terminal connects locally to the mini-cloud host device over a fast network link or directly via a cable; and
  - a second tier where the thin terminal connects remotely to the backend cloud through the mini-cloud system over a slower network link;
- adding a subscription system that allows a user to subscribe to one or more content provided by the cloud service provider and access the content through the virtual machine supported by the mini-cloud host device, wherein a user subscription process comprises:
  - a step for the user to sign on to a subscription plan provided by the cloud service provider,
  - a step for the cloud service provider to create one or more virtual machine and provision the virtual machine on the mini-cloud host device,
  - a step for a framework server component of the cloud service provider to configure the mini-cloud host device according to the provisioned virtual machine,
  - a step for the user to connect the thin terminal to the provisioned virtual machine running on the mini-cloud host device via the port extension protocol.

18. The method to build mini-cloud system as recited in claim 17 further comprises adding at least one emulator that would run in said virtual machine.

19. A method to build mini-cloud system for enabling user subscription in a residential environment to a computing infrastructure, software, and digital content provided by one or more cloud service provider, comprising:
- preparing a mini-cloud host device that connects remotely to a backend cloud supported by the cloud service provider, the mini-cloud host device comprising a hypervisor for hosting one or more virtual machine;
- adding management interfaces that allow one or more thin terminal for connecting to the virtual machine in the mini-cloud host device via a port extension protocol, wherein the port extension protocol uses a two tier solution comprising:
  - a first tier where the thin terminal connects locally to the mini-cloud host device over a fast network link or directly via a cable; and
  - a second tier where the thin terminal connects remotely to the backend cloud through the mini-cloud system over a slower network link;
- adding a subscription system that allows a user to subscribe to one or more content provided by the cloud service provider and access the content through the virtual machine supported by the mini-cloud host device, wherein a user subscription process comprises:
  - a step for the user to sign on to a subscription plan provided by the cloud service provider,
  - a step for the cloud service provider to create one or more virtual machine and provision the virtual machine on the mini-cloud host device,
  - a step for the user to connect the thin terminal to the provisioned virtual machine running on the mini-cloud host device via the port extension protocol;
- adding a framework client component to communicate with a framework server component of the cloud service provider to configure the mini-cloud host device and the subscription system.

20. The method to build mini-cloud system as recited in claim 19 further comprises adding at least one emulator that would run in said virtual machine.

* * * * *